United States Patent
Chien

(10) Patent No.: US 6,512,478 B1
(45) Date of Patent: Jan. 28, 2003

(54) LOCATION POSITION SYSTEM FOR RELAY ASSISTED TRACKING

(75) Inventor: Charles Chien, Newbury Park, CA (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/513,982

(22) Filed: Feb. 26, 2000

Related U.S. Application Data

(60) Provisional application No. 60/171,750, filed on Dec. 22, 1999, and provisional application No. 60/173,936, filed on Dec. 30, 1999.

(51) Int. Cl.[7] .................... H04B 7/185; G01S 5/02
(52) U.S. Cl. .................. 342/357.09; 342/357.1; 701/213; 340/572.1
(58) Field of Search .............. 342/357.09, 357.1, 342/457, 385, 386; 701/207, 213; 340/572.1

(56) References Cited

U.S. PATENT DOCUMENTS

| | | | |
|---|---|---|---|
| 4,323,183 A | * | 4/1982 | Duchin |
| 5,119,104 A | | 6/1992 | Heller .................. 342/450 |
| 5,776,278 A | | 7/1998 | Tuttle et al. ............ 156/213 |
| 5,804,810 A | | 9/1998 | Woolley et al. ......... 235/492 |
| 5,878,369 A | * | 3/1999 | Rudow et al. .......... 701/215 |
| 5,936,527 A | * | 8/1999 | Isaacman et al. ...... 340/572.1 |
| 5,959,568 A | * | 9/1999 | Woolley ................ 342/42 |
| 5,960,047 A | * | 9/1999 | Proctor, Jr. et al. ...... 375/347 |
| 5,977,913 A | * | 11/1999 | Christ ................. 342/465 |
| 5,982,808 A | * | 11/1999 | Otto .................. 375/204 |
| 5,995,046 A | | 11/1999 | Belcher et al. ......... 342/450 |

OTHER PUBLICATIONS

Article titled, *Designing A Positioning System For Finding Things And People Indoors*; IEEE Spectrum Sep. 1998 vol. 35 No. 9.
Article titled, *The Practical Engineer, Designing A Positioning System For Finding Things And People Indoors*; from website www.pinpoint.com/_private/whitepaper/rfld.htmll; Feb. 24, 2000; pp. 1–11.
Articles from website of AIM titled *The AIM Global Network Standards: What is Radio Frequency Identification (RFIO)*; Feb. 24, 2000.
Pages from website of PinPoint www.pinpointco.com; Feb. 23, 2000.

* cited by examiner

*Primary Examiner*—Theodore M. Blum
(74) *Attorney, Agent, or Firm*—Foley & Lardner

(57) ABSTRACT

An extensible short-range tracking system is disclosed. The tracking system disclosed is a multi-level tracking system. At the first level is an RF tag, which is a transmit-only unit that transmits information including minimally an identification number. The transmission from the RF tags are sporadic with timing depending upon the application at implementation. Generally, the transmission timing comprises a transmission, which is repeated periodically at random times. Transmissions from the RF tags are received in a series of relays. The relays may calculate the position of the tags by knowing the position of the relays and the time difference of arrival of the signals from the RF tags by several relays or may pass the information needed to calculate position to a base station. Alternately, the RF tags may generate position information and transmit that information along with the RF tag identifier to the relays. The relays, which may be networked among themselves, then relay the information from the tags to a base station unit. The base station unit may be part of various applications such as a fire control system in a military application or an inventory system in an industrial application.

58 Claims, 27 Drawing Sheets

LOCATION POSITION SYSTEM FOR RELAY ASSISTED TRACKING

The present invention relates to U.S. Provisional Application No. 60/171,750, filed Dec. 22, 1999, and U.S. Provisional Application No. 60/173,936 filed Dec. 30, 1999, from which priority is claimed.

FIELD OF THE INVENTION

This invention relates generally to the field of location-position systems, methods and apparatuses and, in particular embodiments, to relay assisted location-position systems, methods and apparatuses which employ the use of Radio Frequency (RF) tags and data relays.

DESCRIPTION OF THE RELATED ART

Location position (LP) systems ascertain positions of particular objects and/or track the locations of objects. Historically, location position systems have been quite diverse. Some location position (LP) systems and processes have typically employed sensor devices, such as motion sensors, heat sensors, or the like, for detecting the presence of an object or personnel to be located or tracked. Other LP systems have employed labels or tag elements, such as, for example, bar codes, RF labels, short-range RF tags, long-range RF tags, and the Global Positioning System (GPS) which provide a signal that has location information or is indicative of location by virtue of its transmission.

A simplistic example of a military application utilizing a rudimentary position system is the proximity sensor used in anti-personnel landmines. An anti-personnel mine is basically a proximity sensor coupled to an explosive charge. An anti-personnel landmine is one that detects the presence of a target, for example an enemy soldier, and in response, initiates an explosive charge within the proximity of the detected enemy. Such anti-personnel landmines typically detect whether a target is present or absent from a designated area (i.e. in a local position), but do not track or ascertain actual locations.

Anti-personnel land mines have several disadvantages as a military position detection system. A first disadvantage is that the activation of one anti-personnel landmine provides a warning to any enemy of the possible presence of other landmines. A first anti-personnel landmine detonation may provide an element of surprise, but once a first anti-personnel landmine has detonated, any other enemy target within the area will be alerted to the possible presence of other anti-personnel landmines.

A second drawback of typical anti-personnel landmines is that it does not discriminate between friend and foe. Friendly forces wandering into an anti-personnel landmine area may be destroyed by such mines. Such anti-personnel landmines are also a threat to friendly forces, during deployment. For example, a mine may be accidentally activated or may be activated by the initiation of hostilities before the placement of the mine can be complete. Typical anti-personnel landmines also are nondiscriminatory. That is, they may be detonated by nonmilitary personnel in the area, or remain deployed and active well after hostilities cease.

In some commercial applications, a LP system comprises machine readable labels or tags have been placed on products or items for inventory control and tracking. In other commercial applications, RF transmitting tags have been affixed to, for example, personnel, vehicles, or other objects to monitor or track the position of such vehicles.

A variety of commercial type location-position systems are available from various manufacturers. One example of commercial (LP) systems is the Tiris™ system from Texas Instruments. A typical Tiris™ system could illustratively comprise a Tiris™ transponder and a RFID (radio frequency identification tag) that can be attached or embedded within objects. A Tiris™ unit sends a radio frequency signal to the tag and the tag broadcasts its stored data back to the Tiris™ unit. The data broadcast back to the Tiris™ unit includes a unique 20-digit code that identifies the RFID tag to the Tiris™ unit. Such a system provides an identification of an RF tag in close proximity to a Tiris™ reader. It, however, provides no location information. Although the Tiris™ system can identify an RF tag, it cannot track it.

Other commercial systems provide tracking capability. One such commercial system that provides tracking capability is provided by PinPoint Corporation of Billerica, Mass. PinPoint provides a product called a 3D-iD™ location position system. The PinPoint system comprises three basic building blocks: RF tags, cell controllers and software. The 3D-iD™ tags can be attached the item desired to be tracked. The tag receives 2.4 ghz spreads spectrum signals from the 3D-iD™ system antennas and responds with a 5.8 ghz signal which includes data uniquely identifying the tag. Tags can be read at ranges up to 200 feet and hundreds of tags can be read by a single cell controller.

The 3D-iD™ cell controllers coordinate exchange of data between antennas and the tags. The cell controllers communicate with the tags via a 2.4 GHz radio signal. The controllers then receive a re-transmitted signal and calculate the time delay between the originally transmitted 2.5 GHz signal and the return 5.8 GHz signal. By receiving the return signal from the tags with several antennas and noting the difference in the time delay the exact identity and location of the tags can be determined.

The PinPoint system also comprises viewpoint software which allows a user to display the information gathered by the PinPoint system. The PinPoint system can offer both identity and location information in range.

While various military and commercial location or tracking systems have been developed, many systems tend to require relatively large and/or expensive tags disposed on the objects or personnel to be located or tracked. Other systems employ relatively unsophisticated detecting or sensing devices such as proximity sensors that do not sufficiently discriminate between intended targets and non-target objects or personnel. Proximity sensors can detect only presence but cannot tell if friend or foe has been detected. As such, the practical application of such systems has been limited.

Military systems have also employed methods such as automatic target recognition (ATR). Automatic target recognition employs signal processing methods which attempt to recognize sound signatures of targets. By processing the sound emitted by various targets, frequency and amplitude relationships can be identified that can be used to distinguish various targets. In addition, by applying multiple sensors and directional principals a target can be located.

While automatic target recognition can be effective, environmental factors such as wind, rain, and noise can interfere with ATR and render it inaccurate.

SUMMARY OF DISCLOSURE

To address limitations in the prior art described above, and to address other limitations that will become apparent upon reading and understanding the present specification, an RF tag and tracking system, comprises a plurality of tags (preferably, low-power, radio frequency (RF) identification tags), and a base station and intermediate tracking relays is disclosed. In certain embodiments of the present invention, intermediate relays provide single or multi level links between low-powered RF tags and the tracking base station.

According to one embodiment of the invention, each tag is provided with processing circuitry for determining the location position of the tag. According to another exemplary embodiment, position determining computations or functions are instead performed in intermediate relay nodes, which serve as intermediate units between the tags and the positioning base station. In yet a further exemplary embodiment, position determination functions are centralized in a base station, thereby relieving the tags and the intermediate relays of the burden of location position determination.

According to further embodiments of the present invention, tags are automatically activated by a trigger mechanism, for example, upon deployment of the tags. Such a trigger mechanism may also load information corresponding to an initial position into tags, for example, from a GPS signal produced within a deploying mechanism. The tag position can then be tracked by an internal navigation system within the tag.

Further embodiments of a system in accordance with the principles of the invention may include additional aspects and alternate implementations. One such aspect relates to the employment of various networking technologies to extend the tracking range of the tags, as well as providing for robust communications. For example, to address a situation in which a number of relays are destroyed or otherwise not functioning. Relays provide multiple paths for conveying information from the tags to a base station.

Embodiments of the present invention include features that simplify the transmit control. Because the tags transmit asynchronously they do not need a receive function to coordinate transmission between tags. Without a receive function, RF transmissions from the tags cannot be disrupted by an interruption of synchronizing information, because the tags do not accept synchronizing information. In addition, dispensing with the need to synchronize transmissions simplifies control within the tags. The tags transmit at pseudo-random periods instead of continuously. Pseudo-random transmit periods may be determined by pseudo-random number generators within each tag. The pseudo-random number generators may have a built-in seed number, for example, implanted during manufacture, to generate pseudo-random numbers or may generate pseudo-random numbers using pre-assigned tag identification numbers, serial numbers, or the like. In addition to providing communications with low probability of exploitation (LPE) by transmitting at pseudo-random times thereby making it more difficult for an enemy to lock on to transmissions, the tags are able to conserve energy by not transmitting in a continuous mode. Because the tags transmit sporadically, power can be conserved by power cycling parts of the circuitry within the tag when they are not being used. Additionally, the sporadic transmission allows more tag transmissions with reduced transmission collision at the relays or base stations. Additional tag transmissions can be accommodated by increasing the mean time between transmissions from the tags. The mean time between transmissions can be increased by changing the software which generates the pseudo random transmit periods.

Tags can also be tailored for specific applications, for example, tag transmissions can incorporate information in addition to an identifier. For example, in warehousing applications the tag may incorporate a list of items stored within a container. A tag then would not only give the position of the container, but also a list of its contents.

These and other advantages and features of embodiments of the invention will be apparent to those skilled in the art from the following detailed description of preferred embodiments, when read with the drawings and appended claims.

BRIEF DESCRIPTIONS OF THE DRAWINGS

Referring to the accompanying drawings in which like reference numbers represent corresponding parts in all the drawings.

DETAILED DESCRIPTION OF THE INVENTION

Figure 1:
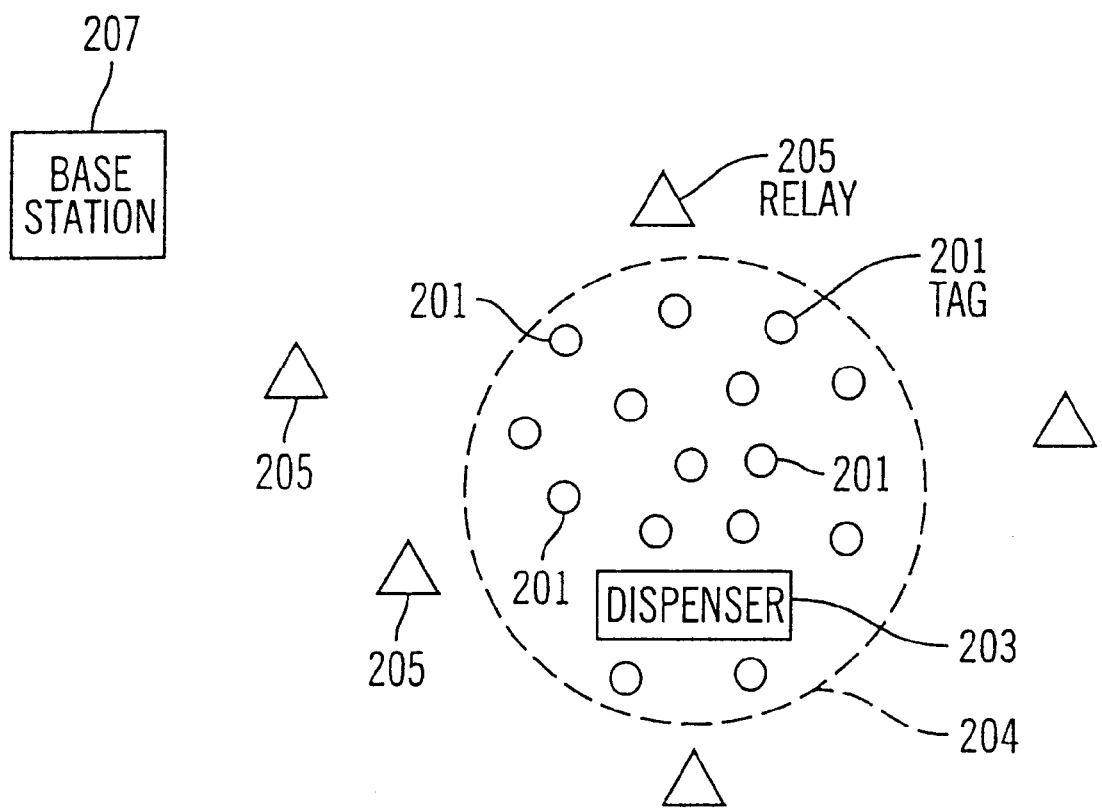
FIG. 1 is a generalized graphical representation of a location position (LP) system according to an embodiment of the present invention.

In the following description of preferred embodiments, reference is made to the accompanying drawings which form a part hereof, and in which is shown by way of illustration a specific embodiment in which the invention may be practiced. It is to be understood that other embodiments may be utilized and structural changes may be made without departing from the scope of the preferred embodiments of the present invention.

Overview

The present invention relates, generally, to location position systems, methods and apparatuses, for locating and/or tracking objects or entities. As will become apparent from the description herein, embodiments of the invention may be employed in a variety of different applications, including various military, industrial and commercial applications. For example, location position systems and methods according to embodiments of the present invention may be used in applications relating to locating and/or tracking inventory, including, but not limited to, inventories of goods, supplies, components used in manufacturing, or manufactured products. Such systems and methods may be employed to locate or track luggage, for example, in an airport or bus or train station, or to locate or track postal or courier packages, or the like.

Location position systems and methods according to further embodiments of the present invention may be used in applications relating to locating and/or tracking personnel, including, but not limited to hospital or business staff, patients, security personnel, children, prison inmates, unauthorized boarder crossers or other individuals or groups. Such systems and methods may also be used for tracking destructive animal pests, animals in zoos, game reserves, parks, or the like.

Location position systems and methods according to embodiments of the present invention have a variety of military applications as well, including, but not limited to, locating or tracking friendly or enemy troops or equipment. In applications related to locating and tracking enemy troops or equipment, such systems and methods may employ location or tracking information to control or direct smart weapons, such as mortars, missiles, bombs or other projectile, or even stationary weapons such as mines, to target the enemy troops or equipment. Representative examples of military and commercial applications are described below to assist in the disclosure of various aspects of the invention. However, it will be understood that aspects of the invention are not limited to the specific representative example embodiments and applications described herein, as many additional applications and subsystems may be devised utilizing the teachings of this disclosure.

Location position systems and methods according to preferred embodiments of the present invention employ RF tags that are associated with objects or entities to be located and/or tracked, for example, by being affixed to each object or entity to be located and/or tracked. Alternately, tags can be programmed with information as or before they are attached to objects. As described in more detail below, each tag is preferably provided with a transmitter for transmitting a location identification signal. In certain embodiments, a relay device is located within the transmission range of each tag, for receiving tag transmissions and relaying signals to a base station for further processing.

In preferred embodiments, the tags are designed to be relatively small and inexpensive, for example, so as to be inconspicuous and disposable. In such embodiments, the electronics associated with such tags are configured to be relatively simple and require minimal power.

The tags may be associated with the objects or entities to be located in a variety of manners, including manual or automated placement of a respective tag on each object or entity to be located or tracked. For example, each tag may be affixed to a respective object or its container, imbedded in the object, placed next to the object, or otherwise associated with the location of the object. In the context of personnel location or tracking, the tags may be, for example, affixed to badges, identification cards, or articles of clothing or other items worn or carried by the personnel to be located or tracked. In some embodiments, tags may be surgically implanted on personnel.

According to other embodiments, the tags are deployed in an area in which an object or entity to be tracked or located may or will be passing. In the context of an manufacturing or inventory application, the tags may be manually or automatically dispensed and associated with objects, such as products, supplies, components or the like, as the objects (or containers containing the objects) are conveyed past a pre-designated location, such as a tagging station along a conveyor path of a production line. If only the general area in which objects or entities may or will pass is known, then tags designed to affix (or otherwise associate) themselves with passing objects or entities may be dispersed throughout the general area. Such a tag may then be affixed (or otherwise associated) with an object or entity that happen to pass through the general area and which comes within sufficiently close proximity to the tag to allow the tag to affix (or otherwise associate) itself with the passing object or entity.

As noted above, tags may simply be manually deployed and associated with each object or entity to be located or tracked. However, in preferred embodiments, tags are dispensed by an automated or manually controlled dispensing apparatus. In the production line embodiment, an automatic dispensing apparatus may comprise a device located along the conveyor path of the production line, for dispensing and affixing (or otherwise associating) a tag with each product or component passing the dispensing apparatus on the conveyor path. In embodiments in which tags are to be dispersed within a given general area (for example, a general area in which one or more objects or entities may or will pass), a dispensing apparatus may comprise a device for distributing tags randomly, partially randomly, or even at specific locations within the general area.

For purposes of simplifying the present disclosure, representative example embodiments of the present invention are described, with reference to a military context, in which objects or entities to be located and/or tracked are enemy troops or vehicles which are expected to pass through a general area. However, as noted above, it will be understood that various aspects of the invention are not limited to such military embodiments and may, for example, be employed in various commercial or industrial contexts, such as described above.

A position location system according to an embodiment of the present invention, as shown in FIG. 1, includes a plurality of tags 201, a tag dispenser device 203, one or more relays 205 and at least one base station 207. The base station 207 is a device for accepting information from relays. A base station need not be a stationary device and may comprise a variety of configurations such as, for instance, laptop computers or PDA's. The tags 201 include transmitting devices which transmit signals, for example, upon the tag being dispensed by the dispenser 203. In one preferred embodiment, each tag 201 includes a radio frequency (RF) transmitter which transmits signals containing identification information, such as an unique identification code.

The relays 205 include receivers located within the transmission range of tags in the area 204. Each given relay 205 need not be positioned within the transmission range of all of the tags in the area 204. However, it may be preferred that the group of relays 205, as a whole, are positioned to receive transmissions from all tags within the area 204 so as to provide the maximum number of paths for transmissions from any tag to a base station. Another reason it may be preferred that the group of relays 205 be positioned within the transmission range of all the tags in the area is that in the case where the relays perform positioning functions, such as time delay measurements or triangulation measurements on the relays, a greater number of measurements can yield a greater number of data points and thereby enhance accuracy.

The tags 201 are shown in FIG. 1 as having been dispensed by the dispenser 203 and are distributed within a general area 204. The dispenser 203 may comprise an active dispensing device which actively places or propels tags throughout the general area 204. In one example, the dispensing device dispenses tags by activating an explosive charge, pneumatic impulse or other propelling means, which propels tags throughout the area 204. The explosive charge (or other propelling means) may be activated, for example, by a proximity sensor designed to detect an enemy soldier, vehicle or the like within a certain proximity of the sensor. The proximity sensor may be located within the tag dispenser 203 or, alternatively, at other locations remote from the dispenser, such as at an entry path leading to the general area 204. Such a proximity sensor may include, but is not limited to, a vibration sensor, contact sensor, heat sensor, metal detector, combinations thereof or other suitable sensing or detecting means. In further embodiments, the explosive charge (or other propelling means) may be activated by a signal transmitted from a remote location, a timing signal provided at a preset time, or the like. Alternatively, the dispenser device 203 may comprise a passive dispenser designed to dispense tags passively, for example, by adhering the tag to an enemy soldier or vehicle as the enemy soldier or vehicle brushes against or passes adjacent the dispenser.

In the above embodiments, tags 201 may include (or be dispensed with) an adhesive material, attaching hooks, magnetized material or other suitable means for attaching the tags to passing soldiers or vehicles. In one preferred embodiment, tags 201 distributed within the area 204 by a propellant, as described above, attach to soldiers or vehicles which are present in the area 204 at the time of disbursement or, alternatively, adhere to soldiers or vehicles which enter into the area at some time after disbursement. Tags 201 distributed by a passive dispenser device, as described above, attach to soldiers or vehicles which brush against or pass sufficiently close to the dispenser.

The tags may be configured and/or camouflaged to appear as part of the environmental surroundings of the area 204. For example, in contexts in which the area 204 is a natural environment, such as a wooded area, forest, field, or the like, the tags 201 may be configured to appear as small thorns, cockleburs or other parts of plants that form part of the natural vegetation of such an area. Thus, a soldier traveling through vegetation within the area 204 may not notice one or more tags that become attached to the soldiers clothing or vehicle.

In operation, a tag 201 dispensed within an area 204 and attached to an enemy soldier or vehicle transmits a signal, which, in one example, includes an identification code unique to the tag or unique to the tag dispenser 203 that dispensed the tag. The signal is then received by one or more relays 205, which transmit corresponding information to a base station 207.

Figure 1A:
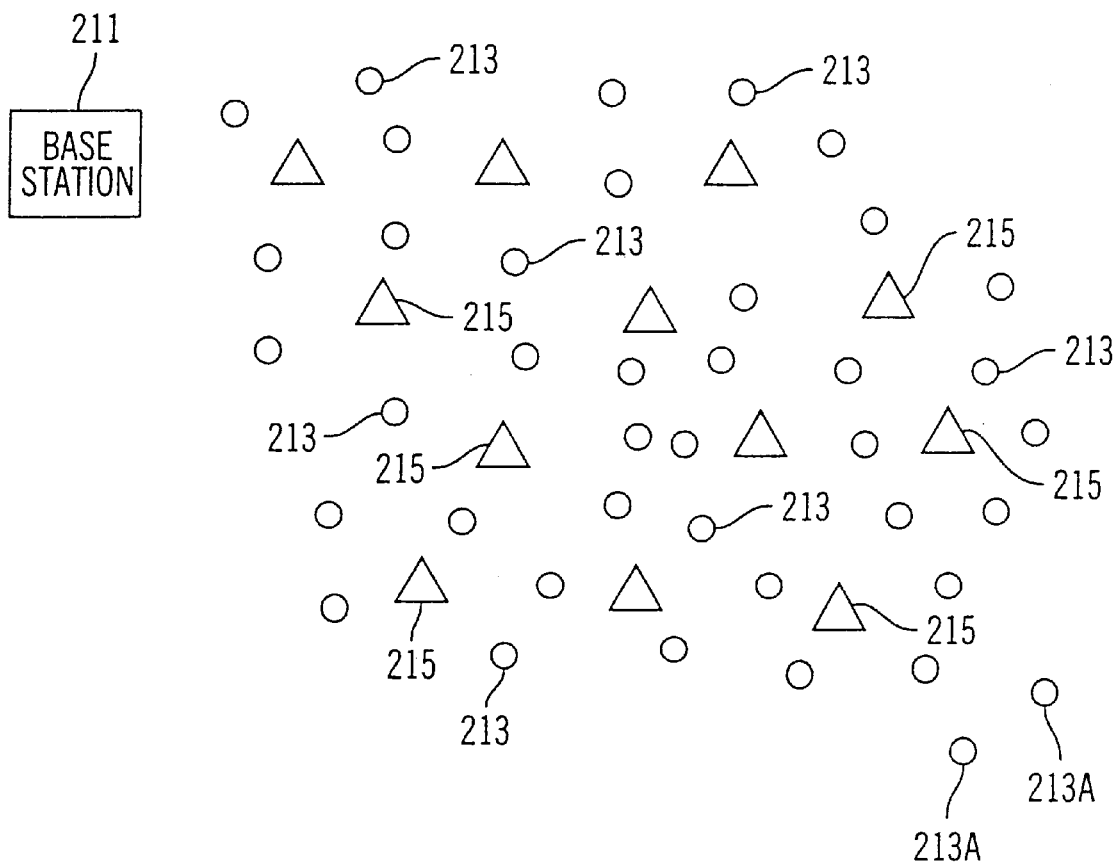
FIG. 1A is a generalized graphical representation of an alternate location position system according to a further embodiment of the present invention.

FIG. 1A is a generalized graphical representation of an embodiment of an alternate location position system. In FIG. 1A, a base station 211 receives transmissions from relays 215. The relays in turn receive transmissions from RF Tags 213 as well other relays 215. Because the relays 215 have an embedded networking type protocol they can receive signals from both nearby relays 215 and nearby tags 213. The relays 215 can then transmit data received from both nearby relays 215 and nearby RF tags 213. In this manner information can be passed "bucket brigade" style from a distant tag such as 213A, which is so far from the base station 211, that its transmissions could not be directly received by the base station 211.

By interspersing tags 213 and relays 215, as shown in FIG. 1A, the system can be extended indefinitely, limited only by the capacity of the relays to transmit data. Using this scheme, tags 213 can be tracked over a large area as long as there are sufficient relays 215 that can form a link between the tag 213 and the base station 211.

As described in further detail below, the signals transmitted by the tags may include location identification information which may be processed by suitable electronics either in the relays 205 or the base station 207, for identifying the location (or approximate location) of each tag. The decision whether to include the processing for position determining in either the relays or base station may depend on a variety of factors such as whether the base station is a large immobile unit, in which case processing power could easily be included or whether it is a small handheld device with limited processing power.

In more sophisticated tag embodiments, such location information may be generated or modified by motion sensing devices, such as inertia detectors or gyroscope devices located on the tag or dispensed with the tags. Alternatively or in addition, such location information may comprise satellite-signal positioning system data, such as data generated by a global positioning system (GPS) located on the tag or on the dispenser 204 that dispensed the tag. In yet further alternative embodiments, tag location may be determined by the relays 205, for example, by triangulation methods well known in the art.

The base station may include or control automated weapon guiding systems that employ the tag location information to guide, for example, munitions toward the location of the tag. Because the tags 201 might be passively or surreptitiously attached to targets, targets would not likely be forewarned of the positioning and targeting action of the system.

The surreptitious targeting provided by the tag is in contrast to the conventional anti-personnel mine, which announces its presence through the production of an explosion. In addition, because the tags could be located and/or tracked, the targets could be attacked at a position somewhat remote from the attachment point of the tag. This would provide the advantage of minimizing the risk that the target would be warned of how it was being targeted.

Also, because the target could be tracked for a period of time before firing munitions, the system may be employed to implement policies which require visual (or other confirming) verification that the target is an enemy target before firing munitions. Accordingly, embodiments of the present system may minimize collateral damage to friendly forces or indigenous nonmilitary personnel. Furthermore, unlike conventional landmines, tags which had not been dispensed at the cessation of hostilities would offer no hazard and would not required careful tracking and disarmament after the cessation of hostilities.

Identification tags might also be used to track the location of friendly forces during a mission. In addition, the tags could be coded with certain ID codes to identify different types of military personnel, e.g., infantry, mortar, etc.

The system may employ anti-tampering or other security measures to inhibit an enemy from using the tag communications against the friendly forces. For example, tags may be controlled to transmit sporadically, to make it difficult to lock to a signal unauthorized information gathering difficult. In addition, a large number of decoy tags could be deployed. The resultant clutter could make it more difficult for an enemy to track all the signals and decide which transmissions provided useful information and which were decoys.

As described above, the location of the position of a transmitting tag may be determined in a variety of manners.

Networked Time Delay of Arrival

Figure 2A:
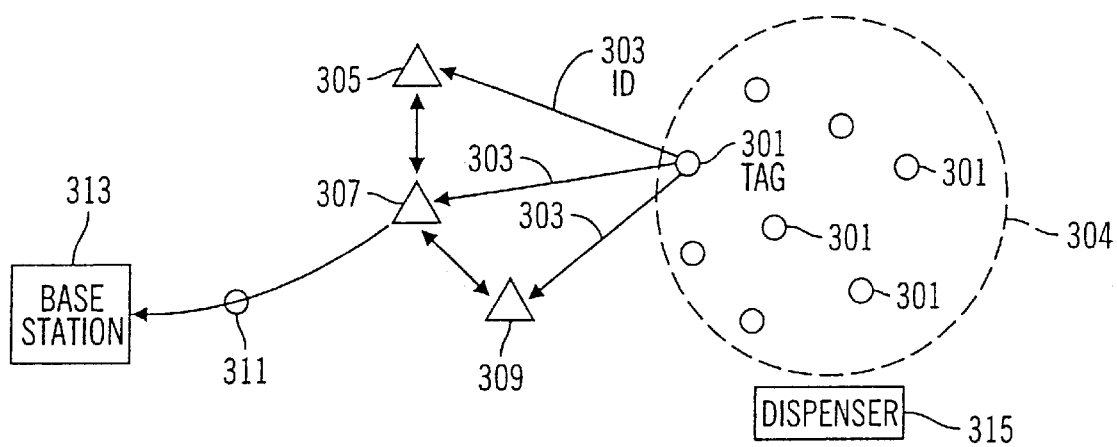
FIG. 2A is a generalized graphical representation of a location position (LP) system with distributed Time Delay Of Arrival (TDOA), according to an embodiment of the present invention.

FIG. 2A is a graphical representation of a networked Time Delay Of Arrival (TDOA) embodiment of the present invention. In the embodiment of the invention illustrated in FIG. 3, tags 301 may be dispensed and activated. The tag may be activated by the dispenser 315, for example by an inexpensive vibration detector, when dispensed. Actuating tags as they are dispensed can help conserve power. Alternatively, in embodiments in which the tags are dispensed within an area 304 before an intended target enters the area, the tags may later be activated upon being attached to the target when the target enters the area. Each activated tag transmits a unique Identifier (ID) 303, for example, a multidigit number. The ID 303 transmitted by the tag 301 is received by several relays, for example, relays 305, 307 and 309. Each relay 305, 307 and 309 stores the time that it received the ID 303 transmitted from the tag 301. By comparing the reception times, the relays can ascertain the relative location of the tag with respect to the location of the relays 305, then 307 and 309. If the position of relays 305, 307 and 309 is known in advance or determined when the relays are activated, the location of the tag 301 can be computed. Once the position of the tag 301 was determined, it could be transmitted 311 to the base station 313. By interchanging tag reception time information, the relays 305, 307 and 309 can each individually calculate the position of the tag 301 by comparing the time of arrival of the tag transmission at each individual relay. Alternatively, reception time information may be communicated by each relay to base station 313 and tag location computations may be performed at the base station 313.

RF Tag Embodiment

Figure 2B:
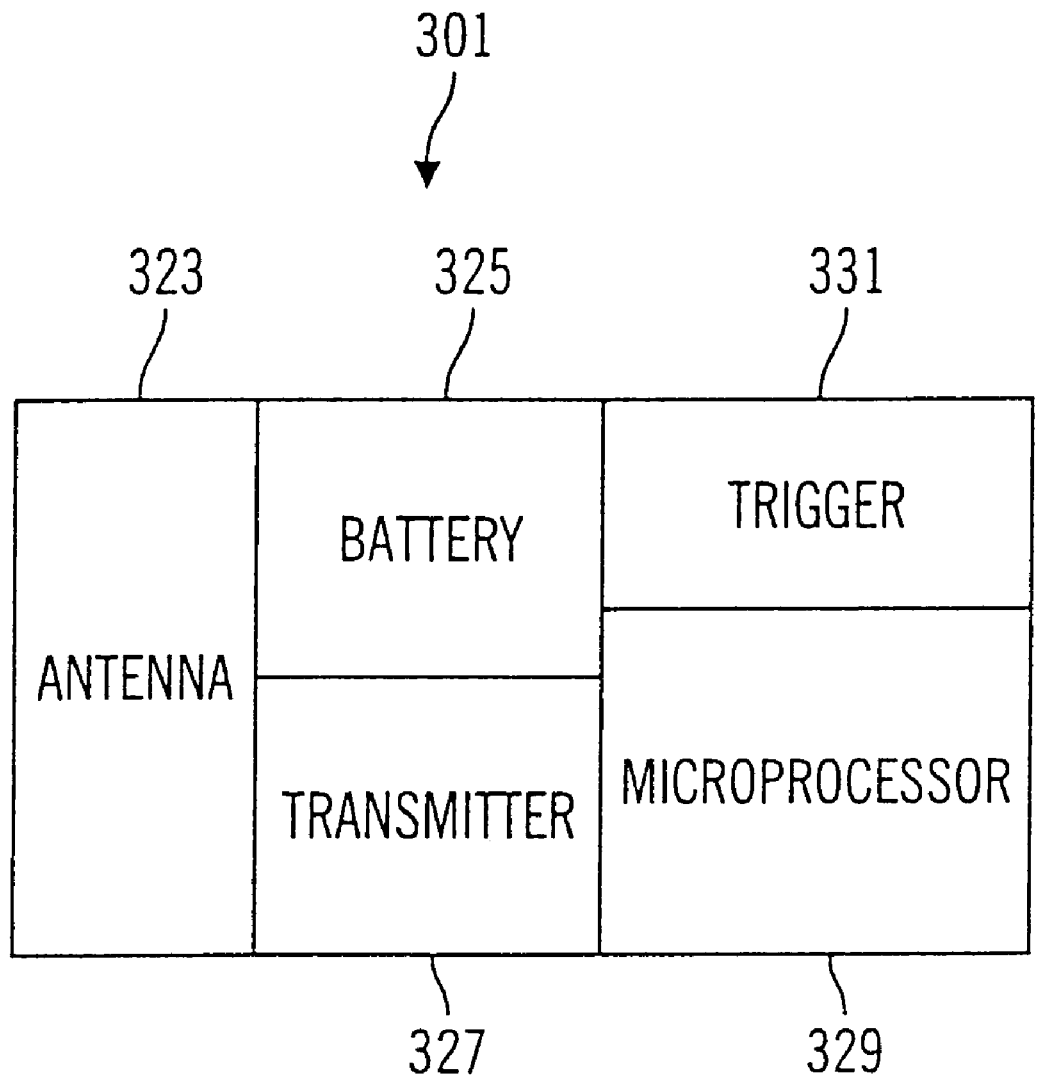
FIG. 2B is a block diagram of an example Radio Frequency (RF) tag as may be used with the embodiment illustrated in FIG. 2A.

FIG. 2B is a block diagram of an RF tag 301 as may be used with the embodiment of FIG. 2A. A trigger 331 activates the tag. The trigger may be activated by a dispenser 315 during dispensing. Alternatively, the trigger may be activate by action of the tag being attached to a target. The trigger may comprise, for example, a magnetically activated switch which is activated upon coming into close proximity with a magnetically conductive material, such as metal components of a vehicle. Alternatively, the trigger may comprise an accelerometer switch which is activated by acceleration, such as acceleration generated during dispensing or by movement of the tag when the tag becomes attached to a moving soldier, vehicle or other moving target. Other suitable trigger mechanisms may be used in further embodiments of the invention. Also, as will be noted later, the trigger mechanism 331 can be completely eliminated and the tag activated by providing it with power.

The tag 301 also contains a power source, for example, a battery 325 which powers other elements of the tag, computing element such as a microprocessor 329, and a transmitter 327. Alternatively, the power source may comprise a solar cell array, an inductive power supply, or a movement generator, as described below. The microprocessor computes time to transmit from a pseudo-random time generating algorithm within the microprocessor. The microprocessor also formats the unique ID number of the tag which is then provided to the transmitter for transmission by the antenna 323. While more expensive tag embodiments may employ synchronized timing means, such as crystal timing devices, the RF tag in FIG. 2B need not have a crystal locked time base for the precise controlling of the transmission frequency within the transmitter 327, but may include, for example, a Voltage Controlled Oscillator (VCO) (not shown) which may serve as a clock source without a crystal. Temperature compensation may be used to obtain a stable VCO frequency over a wide temperature range. The transmitter 327 transmits the tag ID, preferably at pseudo-random times, for example, as dictated by the microprocessor 329. The allowable time between transmissions of RF tag ID is determined by application dependent parameters. For example, if the RF tag is attached to an infantryman it need not be updated through transmission of the ID number as often as would be necessary if the tag were attached to a faster moving vehicle. The tag may also transmit less frequently on dection of inactivity, such as lack of motion.

Tag Dispensor Embodiment

Figure 2C:
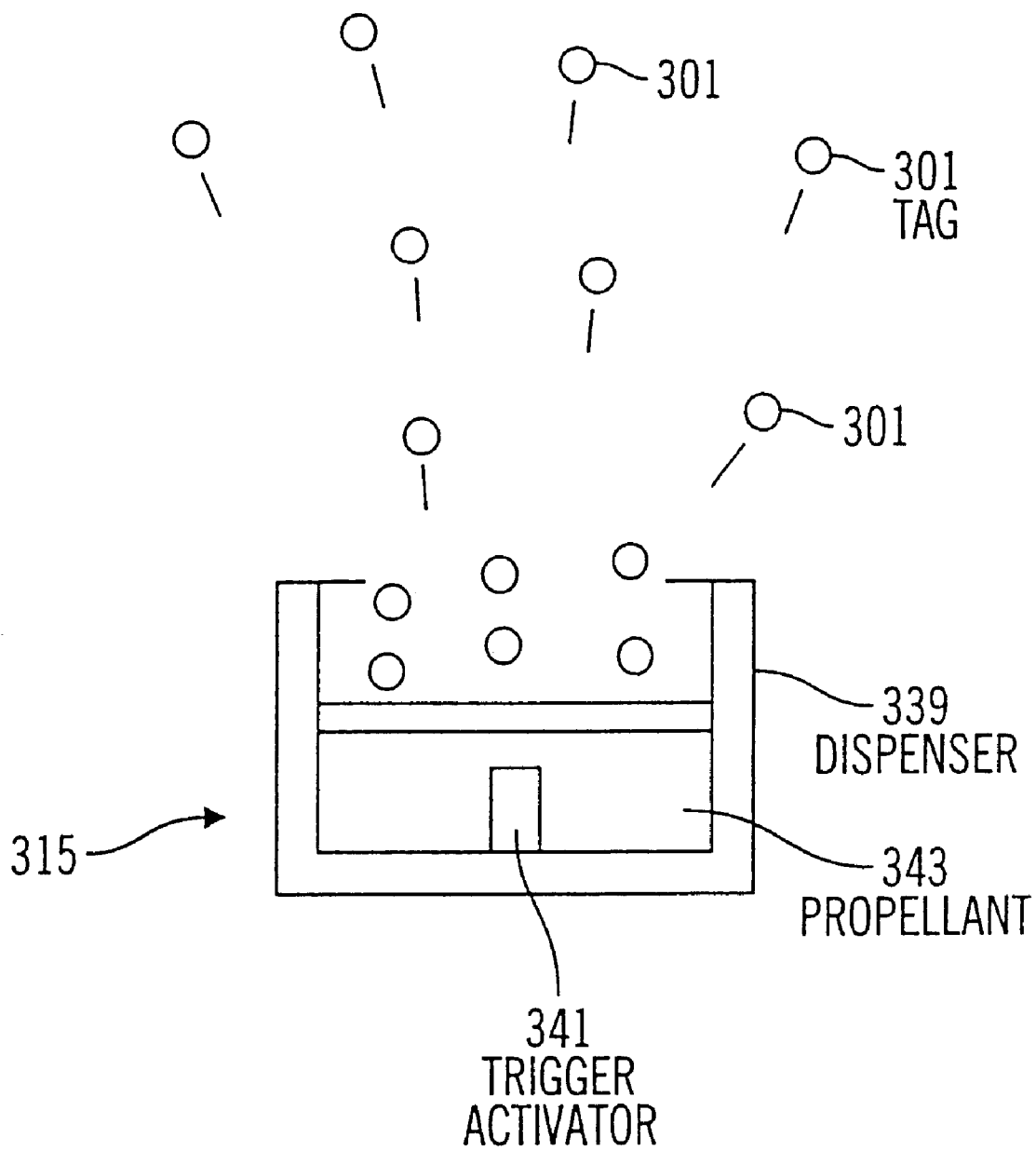
FIG. 2C is a generalized cross-sectional representation of an example tag dispenser as may be used with the embodiment illustrated in FIG. 2A.

FIG. 2C is a generalized schematic representation of a dispenser 315, as may be used with the embodiment of the invention illustrated in FIG. 2A. The dispenser 339 comprises a propellant 343, to eject the tags 301, and trigger activator 341, which will activate the trigger 331 on the RF tags 301. The trigger activator 341 may be a mechanism such as an electromagnet activating a relay within the RF tag, an RF source providing energy to the RF tag, or a variety of other mechanisms well known in the art. Other embodiments are not provided with a trigger activator 341, but instead deploy the tags 301 which automatically become active upon a predetermined delay after deployment.

Relay Embodiment

Figure 2D:
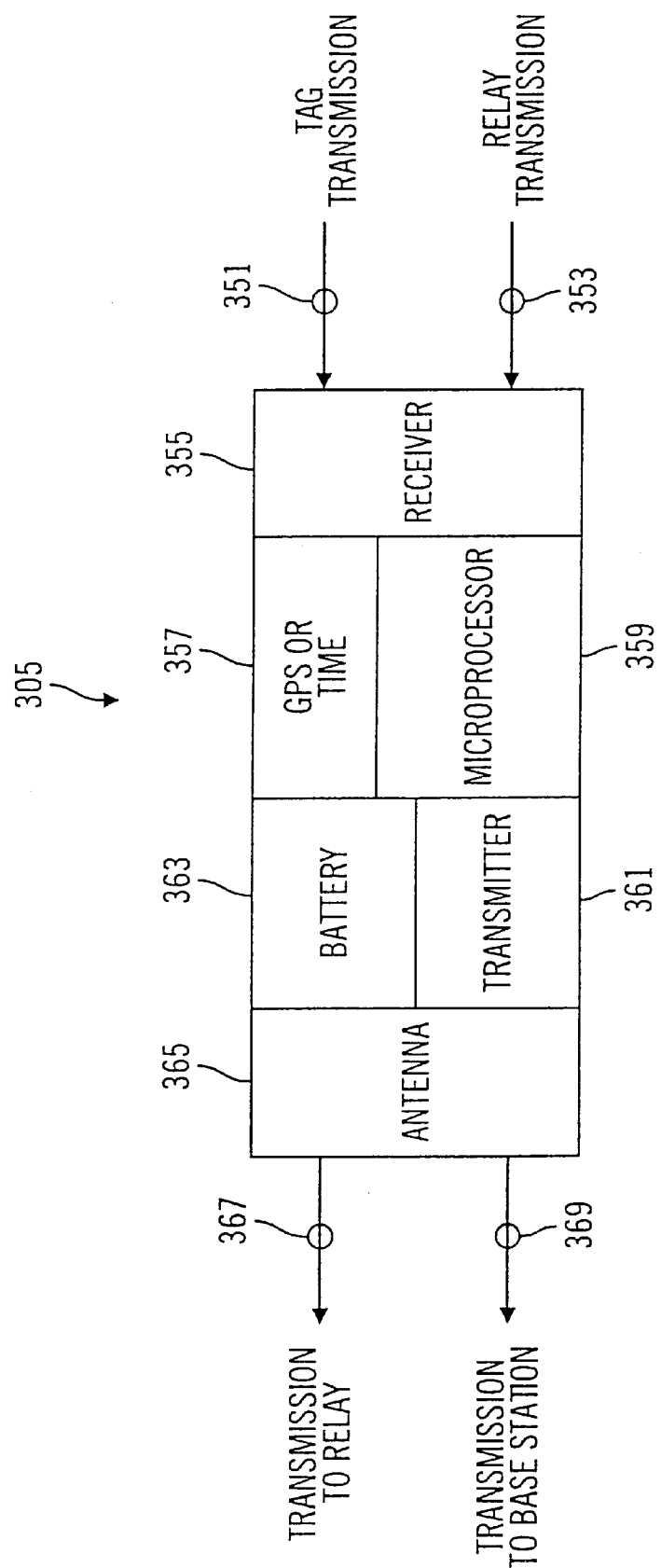
FIG. 2D is a generalized block diagram of an example relay as may be used with the embodiment illustrated in FIG. 2A.

FIG. 2D is a generalized block diagram of a relay 305 as may be used with the embodiment illustrated in FIG. 2A. The relay 305 of FIG. 2D includes a receiver 355 for receiving tag transmissions 351 from RF tags 301 and also for receiving relay transmissions 353 from other relay transmitters. Other similar embodiments may include means of communicating between relays such as wired connections or optical means. In embodiments that use wired, optical or other means than radio to communicate the tag 305 would not use antenna 365 to transmit 367 to other relays. In preferred embodiments the antenna 365, could be used for all radio transmissions and receptions.

In preferred embodiments, the relay contains an accurate time clock and/or an accurate position to determine the arrival or reception time of a tag transmission. In other preferred embodiments, the relay contains a GPS or precision time unit 357. A GPS unit can provide both an accurate determination of the position of the relay and a highly accurate clock. Other embodiments, however, may employ relays installed at predetermined, known positions and an internal crystal controlled clock.

There are a variety of ways of ascertaining the positions of the relay and accurate timing within the relay. A first way to determine relay positions is to include a global positioning system (GPS) unit within every relay. The GPS positioning unit could then provide to each of the relays an accurate location determination as well as a highly accurate clock.

Determining the location of the relays by including a GPS unit within each relay has several drawbacks. A first drawback is that including a GPS unit within each relay unit considerably increases the cost of each relay unit. Additionally, each relay must be placed where it is able to receive GPS information. Requiring each relay to be able to receive a GPS signal is quite limiting because it may preclude the use of this type of relay in many applications such as within valleys, under deep underbrush, inside of certain buildings, and may also require that the weather does not interfere with the reception of the GPS signal at the relay units.

A second method for determining the position of each relay is that it may be programmed when the relay is placed or it may be programmed in if the precise location where the relay will be placed is known. Programming the relays with the location has several drawbacks. First of all it requires that each relay be individually programmed. This can be a significant disadvantage over a case where each relay can determine its own location, i.e., within relays that contain a GPS unit. Another disadvantage of programming in a location to a relay is that the relay may be moved. If a relay with a programmed-in location were moved it would tend to corrupt the location data for the tags.

A third method to determine relay positions is to bootstrap from a few neighboring relays with known position into an array of relays. This method of bootstrapping is illustrating in FIG. 14.

Figure 14:
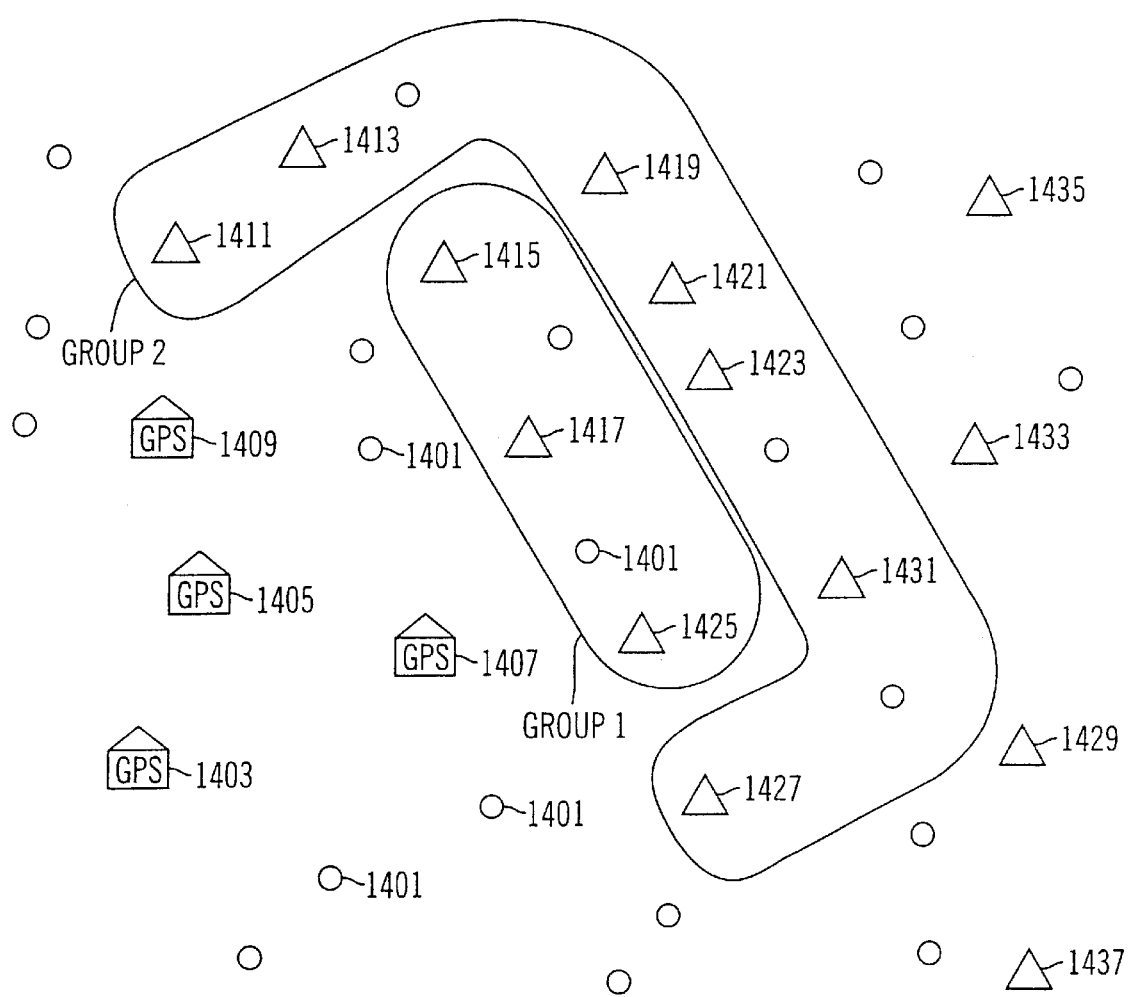
FIG. 14 illustrates the bootstrapping method.

FIG. 14 is a graphic illustration of a relay and tag environment in which the bootstrapping method of relay positioning may be utilized. In the bootstrapping method of relay position, certain relay's positions are known. Relays having known positions can then communicate to relays in unknown positions. The relays in unknown positions can then use the transmissions from the relays in known positions to ascertain their position. The relays with the newly ascertained position can then in turn transmit to other relays which can then determine their position from the transmissions from the relays whose positions had been determined from the first set of relays.

An example of how the bootstrapping method can be used to propagate relay locations through an array of relays can be illustrated with respect to FIG. 14. In FIG. 14 a field containing both relays and tags is illustrated. The tags are represented by the circular elements 1401. The relays are numbered 1403 through 1437. In the illustration 1403, 1405, 1407 and 1409 all contain GPS units. Because relays 1403–1409 contain GPS units, their positions and an accurate time can be easily determined. Relays 1403–1409 can be placed, for instance, in an area in which GPS signals are available. The remainder of the relays then need not have GPS signals available to them.

The bootstrapping method as illustrated in FIG. 14 is initiated when relays 1403 through 1409 determine their positions and the precise time by analyzing GPS signals using techniques well known in the art. After determining their positions and ascertaining a high accuracy time relays 1403–1409 then transmit their position and a time stamps relative to the high accuracy GPS time that they received from their GPS units. Assume that only relays 1415, 1417 and 1425, Group 1 can receive transmissions from relays 1403, 1405, 1407 and 1409. Because the Group 1 relays comprising relays 1415, 1417 and 1425, can receive transmissions from relays 1403–1409, relays 1415, 1417 and 1425 all may determine their precise positions and a precise clock reference. Once relays 1415, 1417 and 1425 have ascertained their positions and a accurate timing, relays 1415, 1417 and 1425 can also transmit their locations and time stamps. Once relays 1403, 1405, 1407, 1409, 1415, 1417, and 1425 can transmit their positions and time stamps, relays 1411, 1413, 1419, 1421,1423, 1431 and 1427 of Group 2 can also determine their position and accurate time reference. In general a relay can ascertain its location and an accurate time reference by receiving transmissions from four different relays, and computing the time delay of arrival of the transmissions. This situation is similar to the situation in which a ground based GPS system receives transmissions from four different satellites in order to determine its position. Under certain circumstances a relay can determine its position by receiving transmissions from less than four different sources having known positions, and may be able to determine its position by receiving transmission from only one relay in certain limited cases.

By receiving location and time information from four different relays a relay can always guarantee that it can determine its own position. A relay can determine its own position when receiving transmissions from less than four other relays in certain instances where use can be made of topography type information. This is a similar situation to reception of a GPS signal. If for example a relay is only able to receive transmissions from three other relays whose position is known then the relay receiving transmissions from only three relays can ascertain that its position must be one of two positions. This situation is illustrated in FIG. 15.

Figure 15:
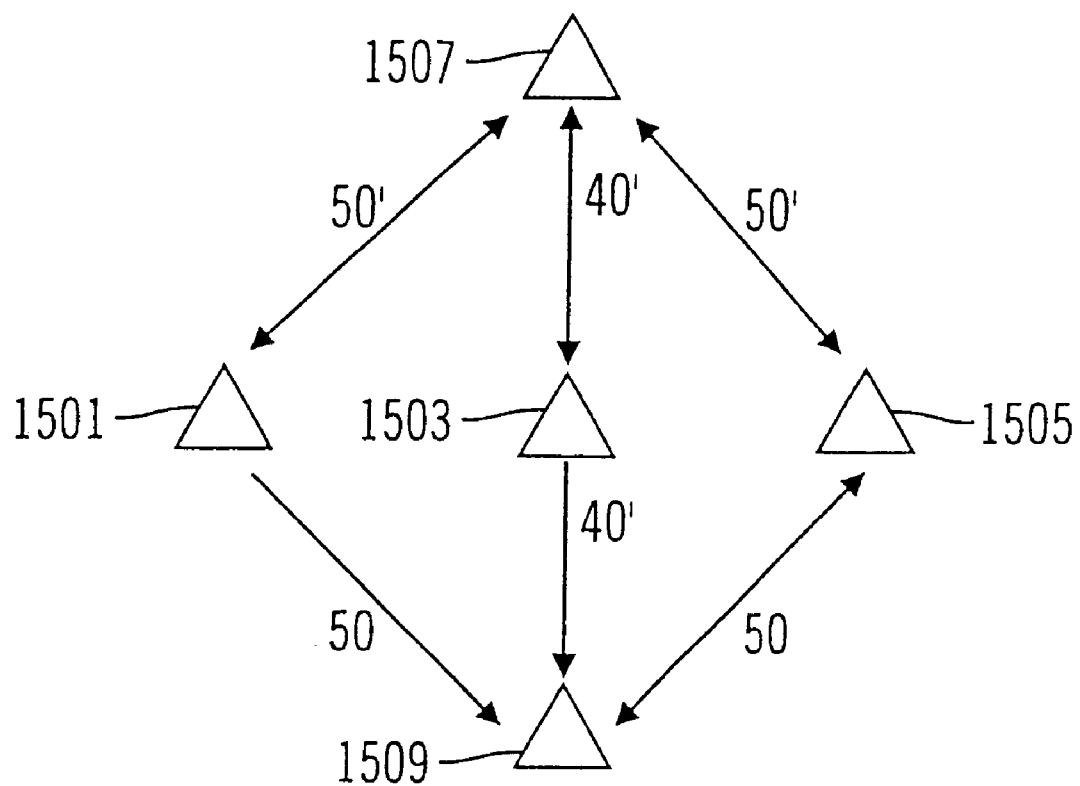
FIG. 15 illustrates relay position determination using three other relays.

FIG. 15 is an illustration of the determination of a relay position from transmissions from three other relays. In FIG.

15 relays 1501, 1503 and 1505 precisely know their locations and times. Relays 1501, 1503 and 1505 transmit their position and time to another relay in an unknown position. Assuming that the relay in the unknown position determines that it is 50 meters from relay 1501, 40 meters from relay 1503 and 50 meters from 1505. If relays 1501, 1503 and 1505 are arranged as shown in FIG. 15 then the unknown relay position must either be 1507 or 1509 as illustrated in the diagram. If the relay, whose position is unknown, contains topographical information then it can know if one of the two positions 1507 or 1509 is impossible, and therefore can be eliminated. For example, if position 1509 is a position that is beneath the ground then the relay in unknown position can safely assume it is in position 1507 and not underneath the ground in position 1509. Similarly in limited cases a relay can determine its position by analyzing the transmissions of less than three relays if it has terrain mapping information contained within the relay.

The bootstrapping method, as illustrated in FIG. 14, begins with full relays 1403 through 1409 knowing their positions, having ascertained the positions from internal GPS units. When relays 1403 through 1409 begin to transmit their coordinates and time information another group of relays, i.e., Group 1, can determine their positions from the transmissions of relays 1403–1409. When the Group 1 relays begin to transmit their positions more relays are able to determine their positions because in addition to the original group of four relays, i.e., 1403–1409 transmissions from the additional three relays, 1415, 1417 and 1425, of Group 1 are available. This enables the relays in Group 2, i.e., 1411, 1413, 1419, 1421, 1423, 1431 and 1427 to receive enough information to determine their positions. This procedure continues until all of the deployed relays can determine their positions. This situation is flexible because it allows a virtually infinite number of relays, if they are in close enough proximity with each other, to determine their positions based on just a few GPS enabled relays grouped in an initial neighborhood. By bootstrapping position information from an initial group of relays containing GPS information a large number of relays can have their position determined accurately without having to add more GPS enabled relays. Additionally since transmitters for relays can be similar to transmitters from the RF tags the GPS position determination function can be placed in a few seed tags, containing GPS units, instead of placing the GPS units in relays, and the relays can then bootstrap their locations using the initial positions of the GPS enabled RF seed tags.

Furthermore the initial positions need not be determined by GPS, any sufficiently accurate method of position determination can be used to implement the bootstrapping method. Time may be determined by synchronizing the relays to a common time base, such as choosing one of the relays as a master time.

Any sufficiently accurate method of position and timedetermination may be used by the relays to impliment the bootstrapping method. A GPS unit 357 is provided for illustrative purposes in FIG. 2d, because such units are commonly well known to those skilled in the art for providing position and time information. Microprocessor 359 and transmitter 361 are powered by a power source, such as battery 363. Alternative power sources, including but not limited to solar cell arrays may be employed in place of, or in addition to the battery 363.

The transmitter 361 in relay 305 can transmit a base station signal 369 to the base station 313, and/or a relay signal 367 to other relays 307 or 309, through the antenna 365. The base station signal may contain position information for one or more RF tags, as described above. The relay signal 367 may be used for communicating tag information between relays. By storing the time of arrival of tag transmissions 351 and receiving the time of arrival of tag transmission from other relays, the microprocessor 359 can be programmed to determine the position of a particular RF tag, as described above. In other embodiments, the microprocessor might receive the transmission from other relays 353 and other tags 351 and format the information for transmission to other relays 367 and the base station 369 without computing the RF tag position. In such a case where the relay merely passed on information the relay might process received signals only to the point of receiving them and retransmitting them. Such implementations might be desirable when an object was to keep the relays as simple as possible. The microprocessor 359 might also contain various types of networking protocols, such as a hopping protocol, a flooding protocol, a pacing algorithm, a link state based routing algorithm or a variety of other networking algorithms, in order to route information gathered from the tags to a base station or other relays. Such protocols may be used to extend the range of the RF tags or to provide redundancy and fault tolerance within the system, by providing multiple paths for RF tag data to reach the base station.

Base Station Embodiment

Figure 2E:
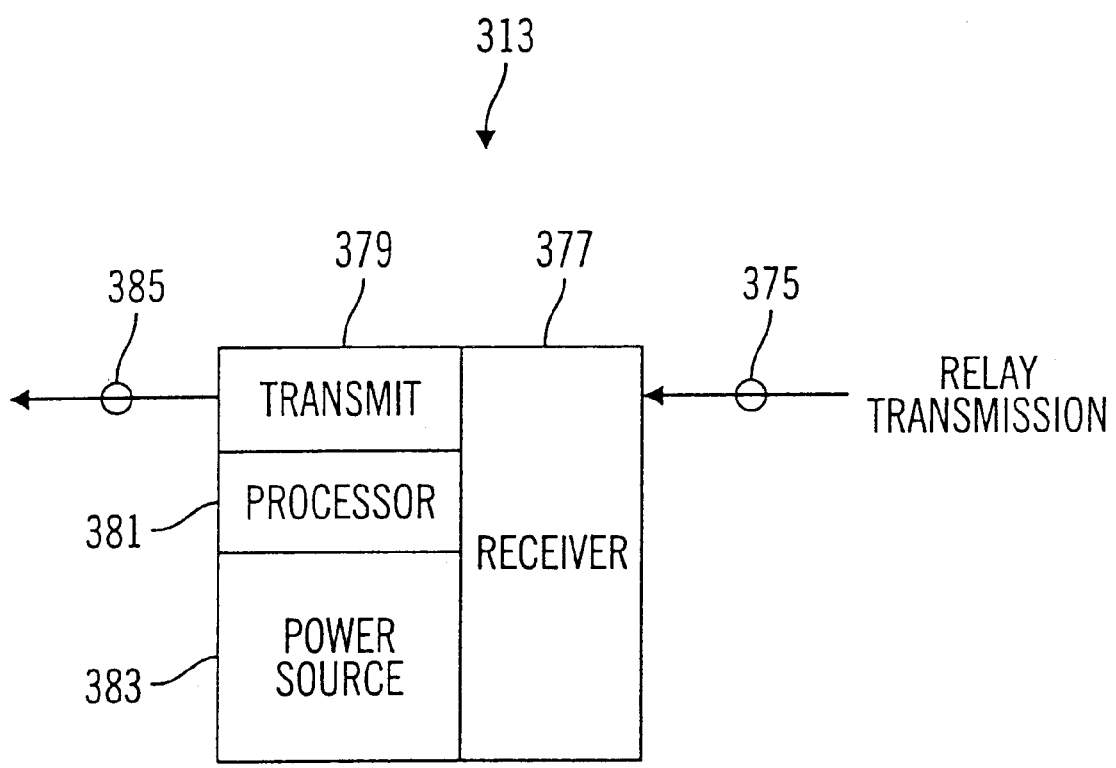
FIG. 2E is a generalized block diagram of an example base station as may be used with the embodiment illustrated in FIG. 2A.

FIG. 2E is a block diagram of a base station 313 as may be used with the embodiment of the invention illustrated in FIG. 2A. In FIG. 2E, the base station 313 includes a receiver 377 for receiving relay transmissions 375. Transmissions may be received by radio, wired link, optical or other means. The base station also includes a power source 383, which may be a battery or other suitable source of power for powering a processor 381, including, but not limited to a solar cell array, a generator, a fuel cell array or the like.

The processor 381 may perform a variety of functions, depending on which functions are performed by the relays. If the position determination has been performed in each individual relay, the processor may receive the information from the individual relays and average the position of the tags as computed by each individual relay. However, if the relays do not perform position determination functions, they may instead be programmed with a networking protocol to ensure that information from all tags including the times of arrivals of transmission from the tags is relayed to the base station. The processor 381 may then use the information of the position of the relays and the time of arrival of the transmission from the individual tags at the relays to compute the position of each of the individual tags. The processor may also implement such algorithms as Kalman filtering to track the position of the tags. Alternately, a Kalman filtering algorithm might be applied within the individual relays 305, 307 or 309, if the individual relays are responsible for position determination or at the base station if the base station is responsible for position determination. The processor 381 can provide tag position information to a transmitter 379 for transmission as target information 385, for example, to a fire control system in a military application or a workstation in such applications as asset tracking, personnel tracking, baggage tracking, etc. The transmission 385 may be by radio or other means such as fiber optic or wire link.

Centralized Time Delay of Arrival

Figure 3A:
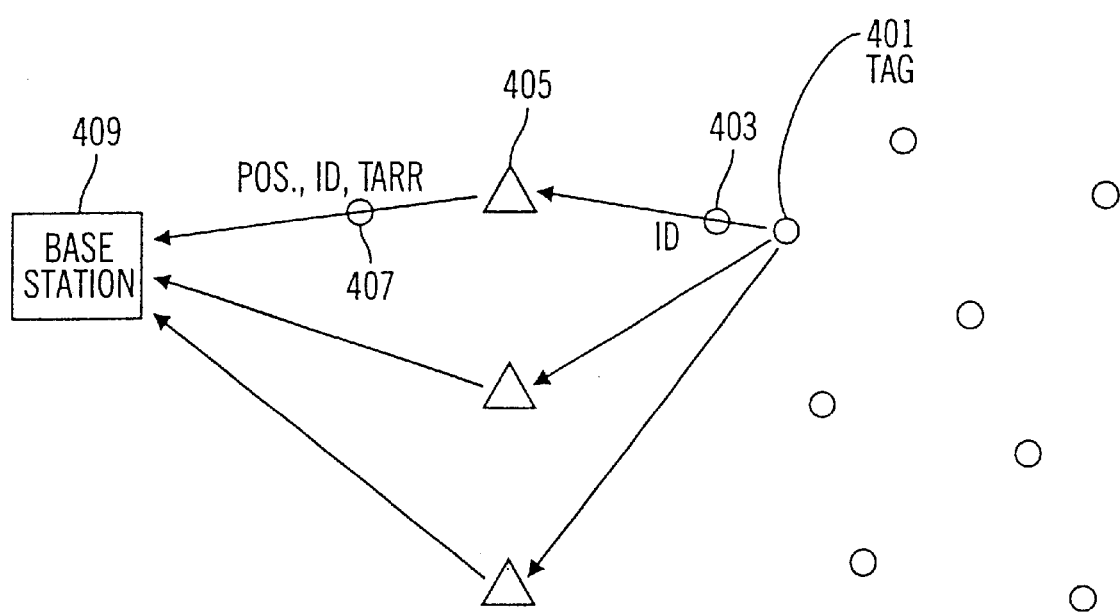
FIG. 3A is a generalized graphical representation of a location position (LP) system with centralized Time Delay Of Arrival (TDOA), according to an embodiment of the present invention.

FIG. 3A is a generalized graphical representation of a centralized Time Delay Of Arrival (TDOA) embodiment of the present invention. In FIG. 3A, the tags 401 transmit their Id signals 403 to a relay 405. In the TDOA embodiment, each relay is provided with a way of determining the time a tag transmission arrived, such as precision time elements. Such a precision time element is one which allows the determination of the difference in the time of arrival of the tag transmissions at the individual relays. The relays 405 transmits the time of arrival, of the ID 403 from the tag 401, along with the particular ID of the tag 401 and the position of the relay to the base station 409. From these transmissions the base station can determine the position of the individual tags. The implementation of the relays within FIG. 3A may be somewhat simpler and less costly than those illustrated in FIG. 2D, because communication between individual relays is not required in the embodiment of 3A. Such a system might be employed in tracking items in a warehouse for example. The relays 405 could be placed in fixed positions within the warehouse. The tags could then be placed on warehouse items which could be tracked to their place of storage within the warehouse. The tags could also be programmed with inventory information such as the date the item was placed in the warehouse. In addition, the base station unit could then be coupled into the internet, and so information regarding items in the warehouse could be available to sales personnel in the field if they were equipped with Internet Ready wireless devices such as the Palm VII handheld programmable digital assistant (PDA) from 3-COM™ Corp.

Figure 3B:
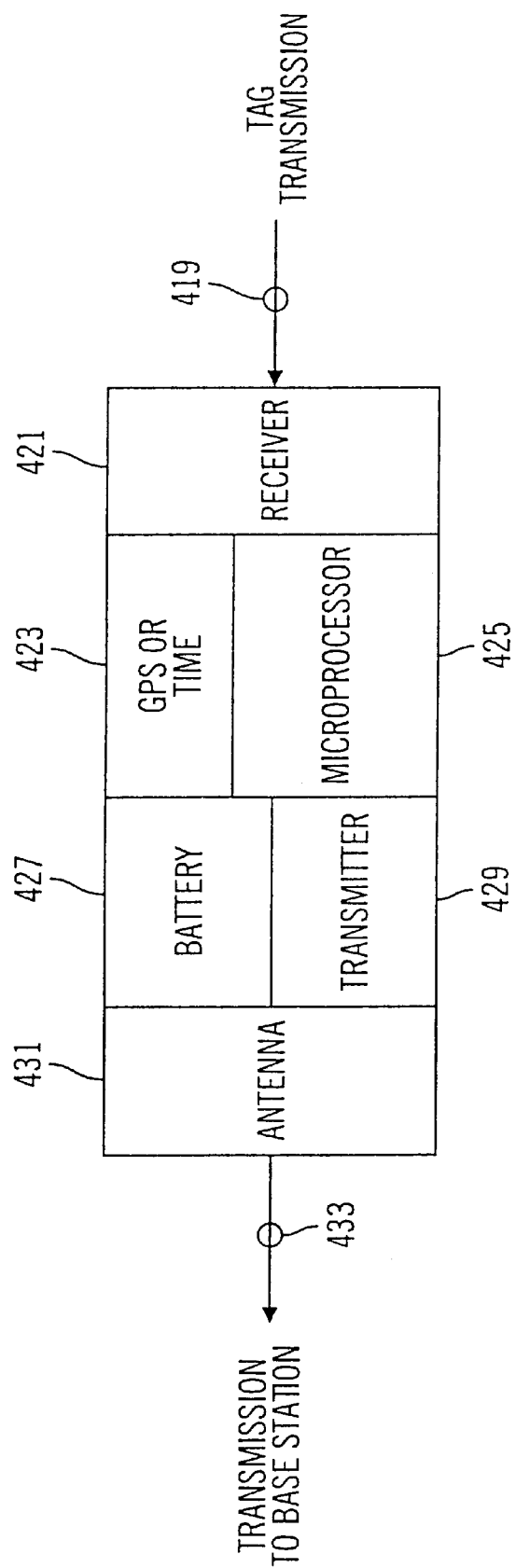
FIG. 3B is a generalized block diagram of an example relay, as may be used with the embodiment illustrated in FIG. 3A.

FIG. 3B is a generalized block diagram of a relay as may be used with the embodiment illustrated in FIG. 3A. The relay in FIG. 3B receives a signal 419 transmitted from a tag using a receiver 421. Since the relay of FIG. 3B does not communicate with other relays, the receiver 421 need not be capable of receiving transmissions from other relays. The relay of FIG. 3B includes a position and time determination mechanism, for example, a GPS 423. In further embodiments, the relay may store pre-recorded position information, for example, recorded or set at the time when the relay was placed, and may include a precision time determination mechanism or clock.

The microprocessor 425 draws power from a power source, such as a battery 427, solar cell array or other suitable power supply, and formats or otherwise processes location information from the GPS system 423 and information from the tag transmission 419. The processed information is provided to a transmitter 429. The transmitter 429 transmits at times determined by the microprocessor 425. The transmitter 429 transmits the location information and the received tag information 419 through antenna 431, to the base station, as represented by the signal 433.

The relay of FIG. 3B is simplified as compared with the relay of FIG. 2D, in that the relay of 3B receives only transmissions from tags and transmits information only to the base station. The relay of FIG. 3B need not contain networking protocol, and so may be less complex and less expensive than the relay in FIG. 3C. Other factors being equal, the relay of 3B can be simpler than the relay of 2D because the microprocessor associated with the relay of 3B need not compute or process network protocols and need only receive RF tag transmissions and transmit one signal 433 to the base station. The relay of FIG. 2D, in contrast, must be configured to receive transmissions from the other relays, as well as signals from the tag transmitters, and must transmit signals 367 to other relays as well as signals to the base station 369. Which implementation is more desirable will be dependent upon the particular application in which the system is used.

Direct Inertial Navigation System

Figure 4A:
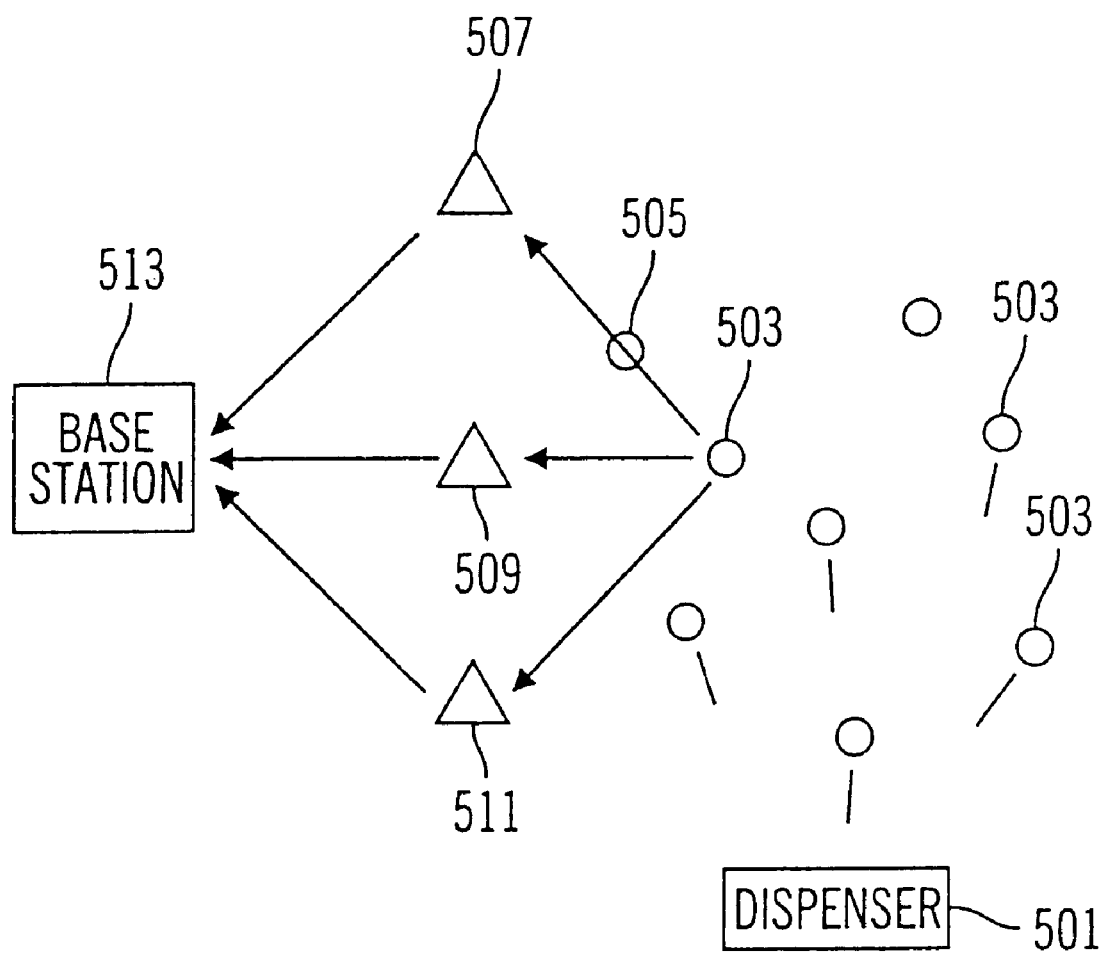
FIG. 4A is a generalized graphical representation of a direct Inertial Navigation System (INS), according to an embodiment of the present invention.

FIG. 4A is a generalized graphical representation of a direct Inertial Navigation System (INS) embodiment of the present invention. In the embodiment of FIG. 4A, a dispenser 501 dispenses and activates RF tags 503. The RF tags compute their own position using an embedded inertial navigation system. The position information is then transmitted from the tag, along with the RF tag's identification code, to relays 507, 509 and 511. The relays then relay the tag location information to a base station 513.

The embedded position location approach of FIG. 4A preferably employs relatively precise sensors and circuits to accurately identify the location of the RF tag. To estimate the position of the tag, an Inertial Navigation System (INS) provided on each tag obtains data for six degrees of freedom. Thus, in preferred embodiments, the INS includes, for example, three gyroscopes oriented in ninety degrees to each other and three accelerometers oriented in ninety degrees to each other. In further preferred embodiments, the size and power consumption requirements of the INS are minimized, so that the tags can be easily deployed and attached to the target and have a maximum operational time.

The inclusion of an INS sensors on the tags pose a significant affect on the cost, size and power requirements of the tag. However, cost, size and power requirements may be minimized, with the use of Micro Electro Mechanical Systems (MEMS). MEMS micromachining technology can allow low cost batch fabrication of small size sensors, in accordance with preferred embodiments of the present application. Various micromachining techniques are available for MEMS devices which include surface micromachining, bulk micromachining and LIGA (LIGA is a German acronym for lithography electroplating and molding and is a methodology for high aspect ratio micromachining).

Figure 4B:
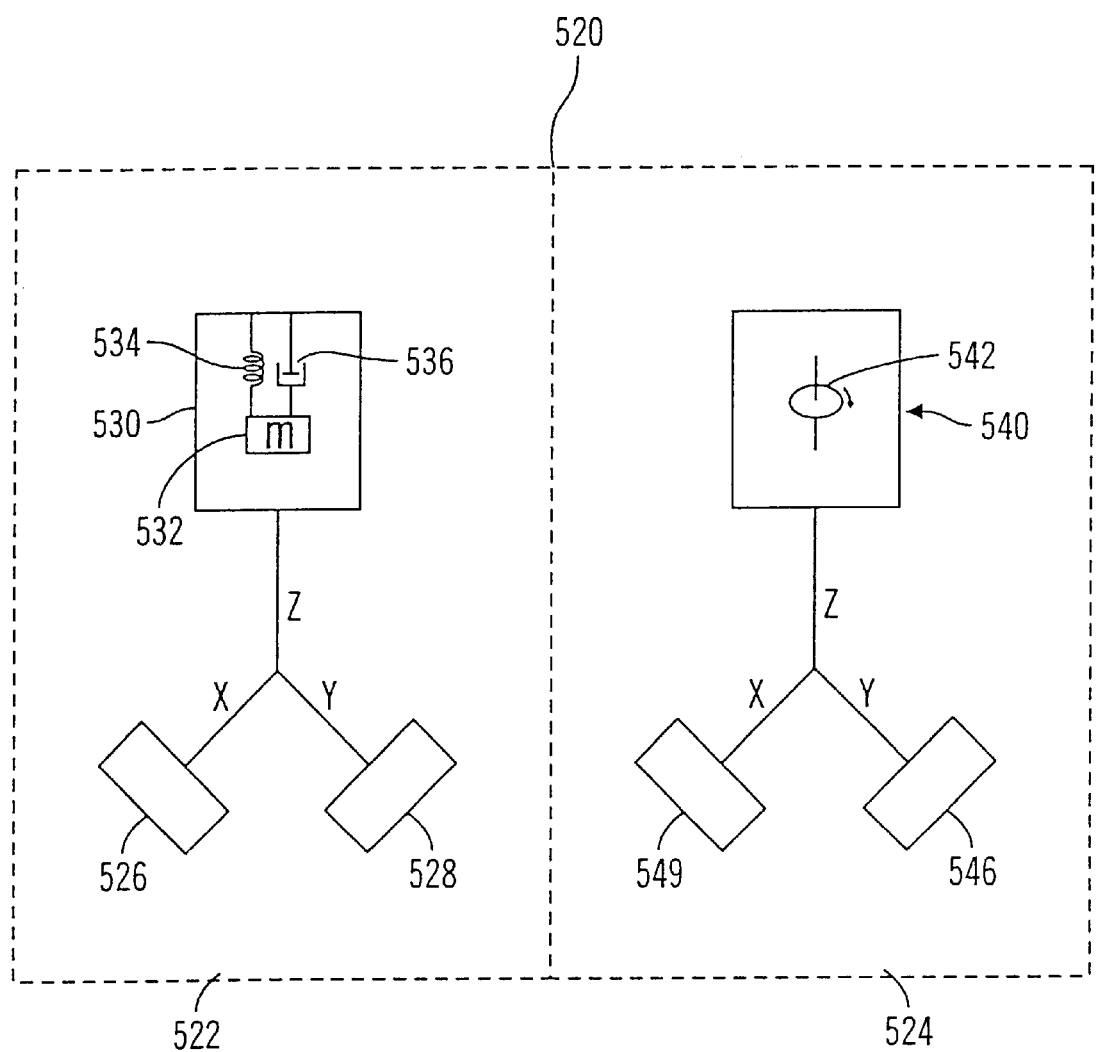
FIG. 4B is a generalized schematic illustration of the components of an exemplary Inertial Navigation System (INS).

As a representative example, FIG. 4B illustrates an embodiment of a INS having six degrees of freedom. The INS 520 comprises an accelerometer module 522 and a gyroscopic module 524. The accelerometer module 522 comprises three identical accelerometers 526, 528 and 530, displaced at 90 degrees from each other in the X, Y and Z directions. The internal structure of an example accelerometer 530 in the Z direction is illustrated, and is similar to that of the X and Y-direction accelerometers. The accelerometer 530 in the Z direction comprises a mass 532, a spring 534 and a dampener 536. Any component of acceleration of the INS in the Z direction will move the mass 532, the movement of which can be then measured by well known techniques. Likewise, any X component of acceleration will be measured by the X accelerometer 526 and any Y component of acceleration will be measured by the Y accelerometer 528.

The Inertial Navigation System (INS) must also compensate for the gravitational force. Therefore the six degree of freedom system illustrated in the present embodiment includes three perpendicularly oriented gyroscopes in addition to the accelerometers. The gyroscope 540 in the Z direction is illustrated and is similar to the X and Y-direction gyroscopes. The gyroscope 540 includes a spinning mass, such as disk 542, spinning about the Z-direction axis. In addition to the gyroscopes in the Z direction, the illustrated embodiment of the INS includes two orthogonally placed gyroscopes in X direction 54*a,* and the Y direction 546. Although the gyroscope 542 is illustrated as the traditional spinning disk various other types of gyroscopes are available such as vibrating and optical gyroscopes. Vibrating gyroscopes include vibrating string, tuning fork, vibrating shell, hemispherical resonator, and vibrating cylinder. Optical gyroscopes include interferometric fiber optic gyro (IFOG) and ring laser gyro. Although optical gyroscopes are presently fairly large and expensive, vibrating gyroscopes can be fabricated using MEMS micromachining technology, at relatively low cost.

The illustrated example Inertial Navigation System (INS) provides information regarding relative movement of a tag. Therefore to know the absolute position of the RF tag, an initial position must be provided to the RF tag. The initial position information can be provided to the RF tag in a variety of ways, including, but not limited to, pre-recorded initial position information stored, for example, at the time that the tag dispenser is placed. Alternatively, the RF tags may contain a GPS locator coordinate. The GPS coordinate might be provided on the tag at the time the tag is activated, for example.

Figure 4C:
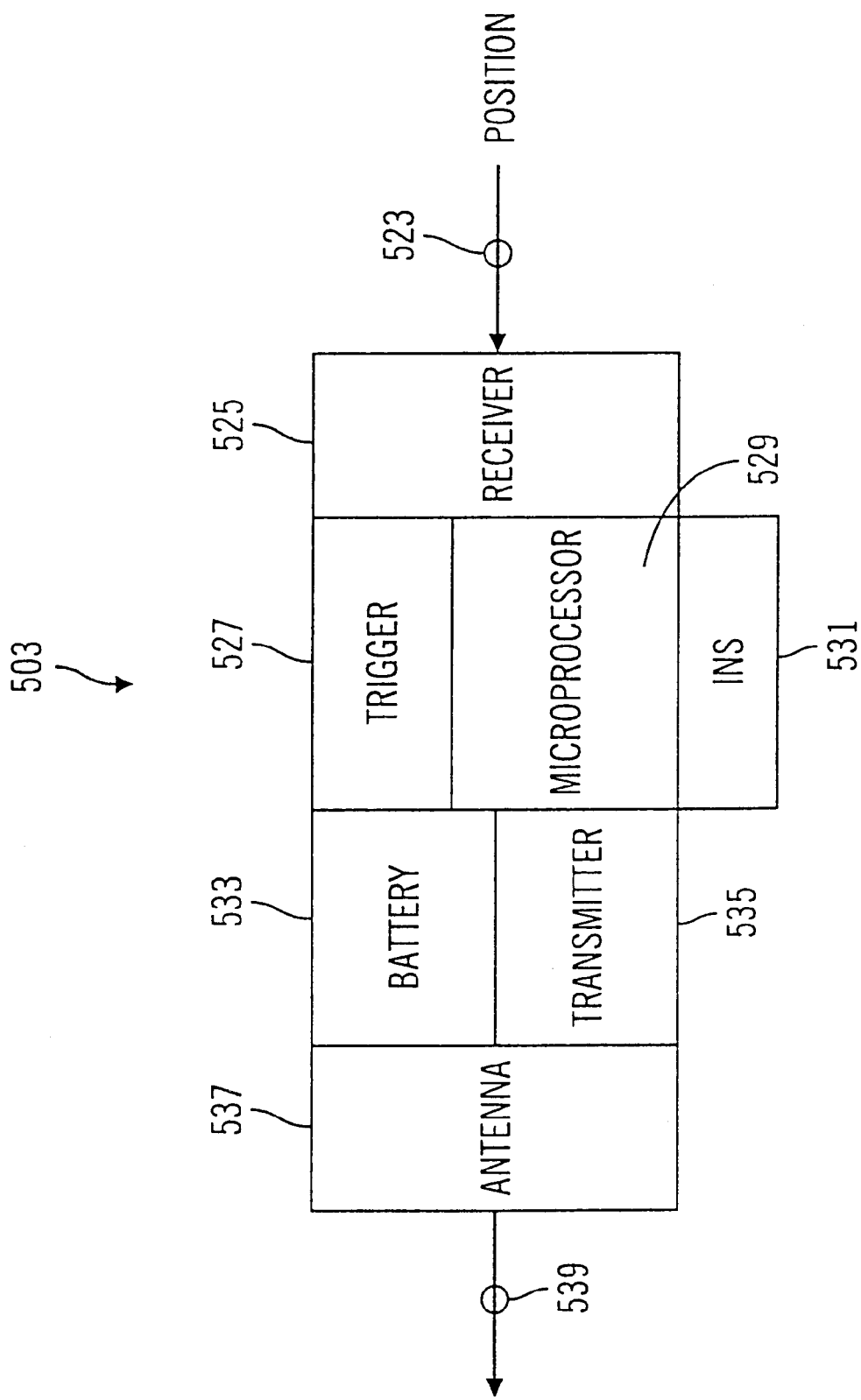
FIG. 4C is a generalized block diagram of an example tag as may be used with the embodiment of the invention illustrated in FIG. 4A.

FIG. 4C is a block diagram of a tag 503 as may be used with an embodiment of the invention illustrated in FIG. 4A. The tag 503 includes a signal receiver 525, a microprocessor 529, an INS system 531, a power source 533, a transmitter 535 and an antenna 537. In the example shown in FIG. 4C, a signal representing an initial position 523 is provided to the receiver 525 in the RF tag. The RF tag may also optionally contain a trigger 527, to activate the tag. In other embodiments, the detection and receipt of an initial position signal 523 may be used to initiate the functioning of the tag.

The microprocessor 529 is powered by a suitable power source, such as battery 533, and processes the initial position information provided to the receiver 525 and further information from the INS system 531. The microprocessor is programmed to accept an initial position as provided by signal 523 and, based on inputs from the INS system 531, locate and/or track the position of the RF tag. The microprocessor 529 is also programmed to provide the position information and a tag identification number to the transmitter 535, for transmission from the antenna 537 to a relay.

The position information signal 523 can be provided to the receiver 525 in a variety of ways. For example, in accordance with a first embodiment in which the location at which the tag is activated is known in advance (such as in systems in which the tag is activated upon being dispensed by a dispenser positioned at a known location), the initial position may simply be recorded or programmed into the RF tag through a suitable electrically programmable memory associated with the microprocessor 529 within the tag.

Figure 4D:
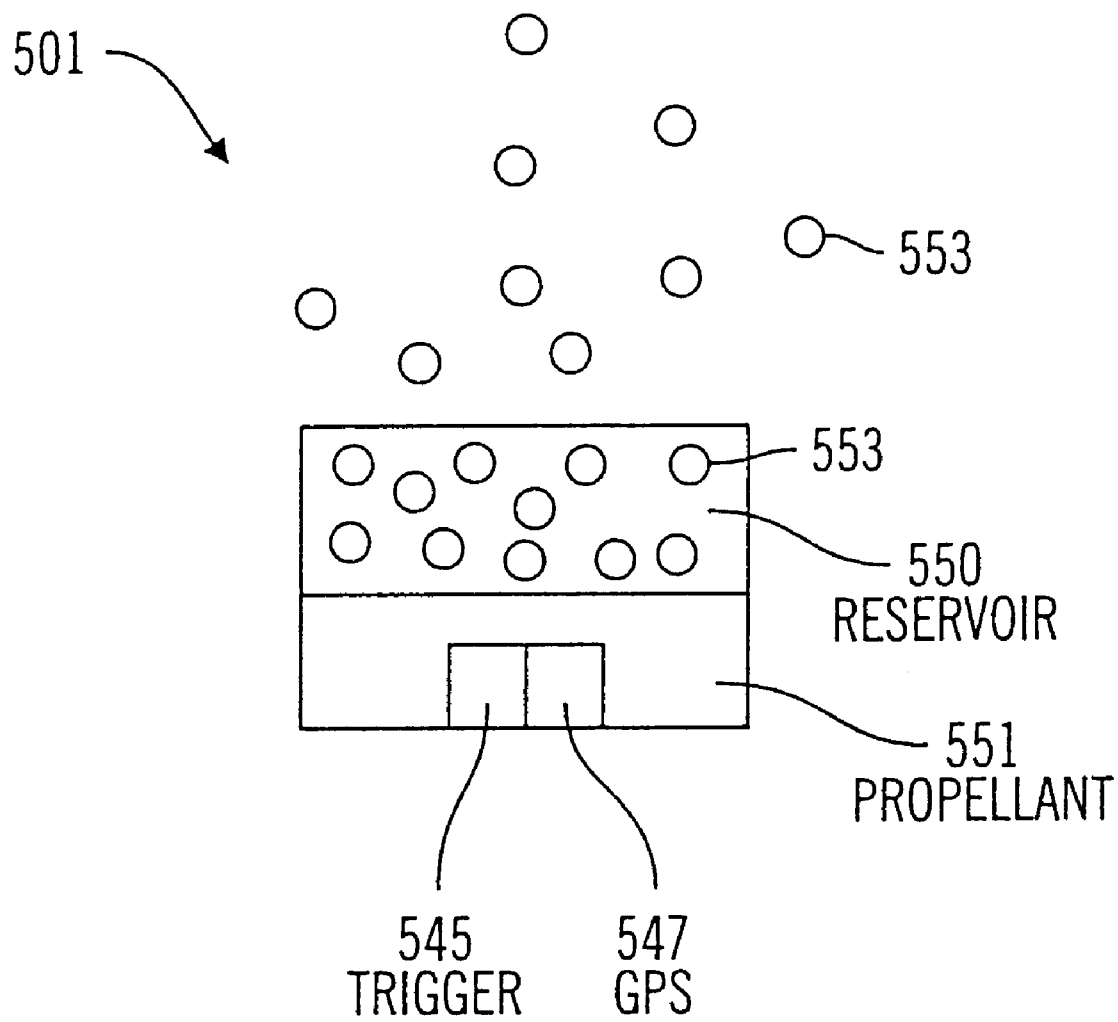
FIG. 4D is a generalized graphical illustration of an example dispenser as may be used with the embodiment of the invention illustrated in FIG. 4A.

According to an alternative embodiment, a position information signal 523 may be provided to an RF tag by a position detection system, such as a GPS, located on the dispenser 501, as illustrated in FIG. 4D. FIG. 4D is a generalized graphic illustration of a dispenser 501 as may be used with the INS embodiment illustrated in FIG. 4A. The dispenser 501 contains a reservoir 550 of RF tags 503. The tags 553 are expelled from the container by activation of a suitable propellant 551, as described above.

Simultaneously with, just after, or prior to, the activation of the propellant 551, the dispenser 501 provides the position information signal corresponding to the position of the dispenser 501 to the RF tags 553. The position of the dispenser may be obtained from a GPS module 547 disposed within the dispenser. Alternatively, the dispenser position may have been pre-recorded in a suitable electronic storage device (not shown) in the dispenser, for example, at the time the dispenser was placed in the field.

A trigger mechanism 545 disposed in the dispenser 501 activates the RF tags and may be used to cause the RF tags to accept a position signal, such as a GPS signal, prior to being expelled from the dispenser 555. The position signal, such as a GPS signal, can be provided to the RF tags in a variety of ways well known in the art, including, but not limited to, magnetic coupling, capacitive coupling, and radio frequency coupling. Because the position of the tag in the embodiment of FIGS. 4A–4D is computed within the tag, the relay may be relieved of functions of computing the position of the tags.

Figure 4E:
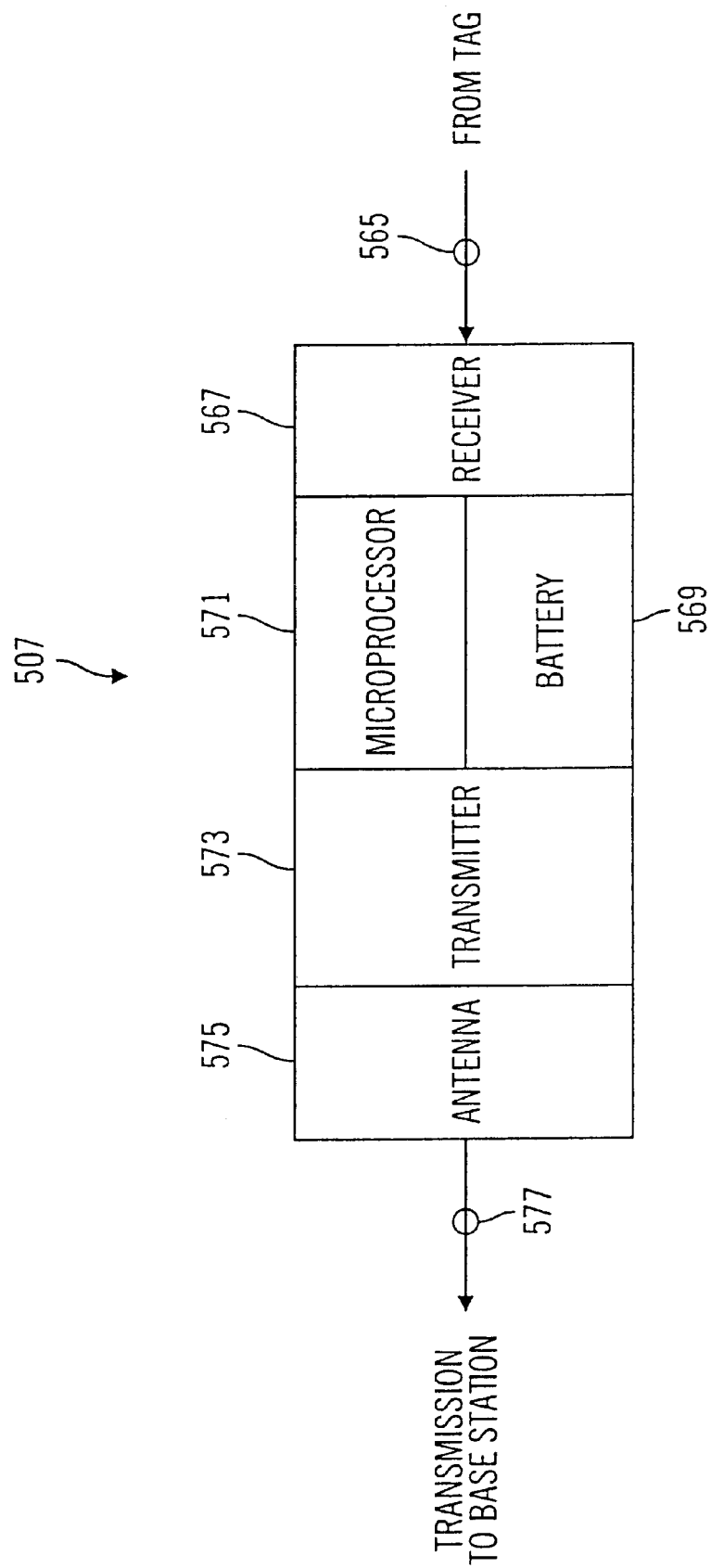
FIG. 4E is a generalized block diagram of an example relay as may be used with the embodiment of the invention illustrated in FIG. 4A.

FIG. 4E is a generalized block diagram of a relay 507 as may be used with INS embodiments of the invention, such as illustrated in FIG. 4A. In FIG. 4E the relay includes a receiver 567, a power source 569, a microprocessor 571, a transmitter 573 and an antenna 575. The relay accepts a position signal 565 from an RF tag through the receiver 567. The position information provided by the signal 565 is then processed by the microprocessor 571 and formatted for transmission by the transmitter 573 and antenna 575. The antenna 575 for receiving and transmitting would likely be the same. When the relay is ready to transmit the position information from the tag, the microprocessor 571 turns on the transmitter 573 for transmission of tag position information to the base station. Alternately, the relay 507 may not even require a transmission antenna. Transmission may be accomplished by other means such as wired or optical links. The relays may also contain networking protocol, for example, as illustrated in FIG. 5A.

Networked Inertial Navigation Systems

Figure 5A:
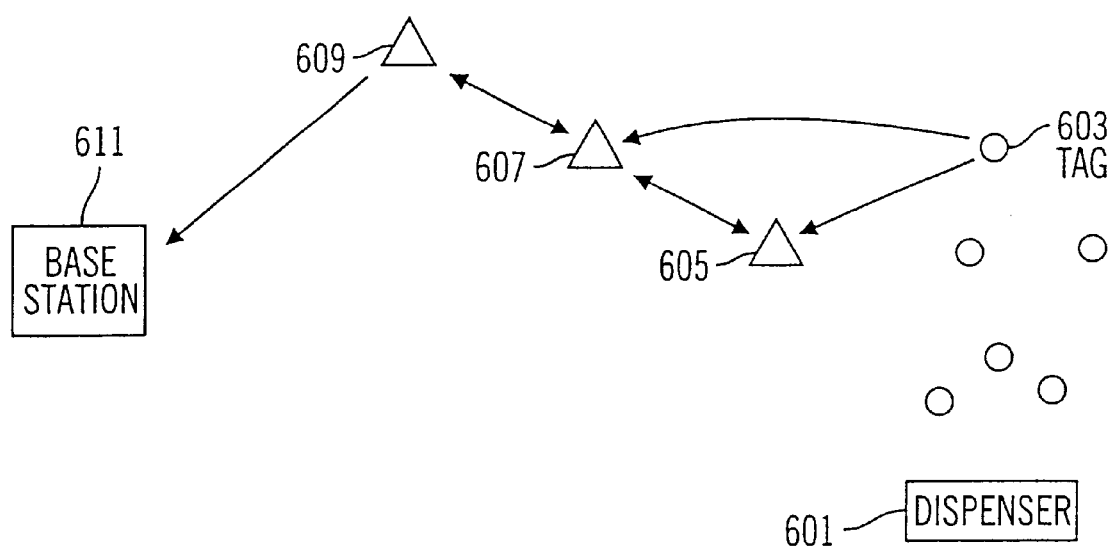
FIG. 5A is a generalized graphical illustration of a networked Inertial Navigation System (INS) embodiment of the invention.

FIG. 5A is a generalized schematic diagram of an Inertial Navigation System (INS) embodiment utilizing an example of a networked relay system. In FIG. 5A, a dispenser 601 activates and expels tag 603. Information from the tags is then provided to nearby relays 605 and 607. The relays, using a networking protocol, attempt to provide the signal to other relays and to the base station 611.

In general, by including a networking protocol within the relays the area over which a system can operate can be extended. A relay will receive all the transmissions it can from all the neighborhood relays and tags within its range and then aggregate all the data received and retransmit it. The data thus transmitted can be received by other relays that will then aggregate it (eliminating duplicate information) and retransmit it. In this way information can travel from a tag through multiple relays before reaching a base station. By providing multiple relays with a networking protocol, distance between the base station and the tags can be increased without increasing the transmission power of individual relays. Although in preferred embodiments relays 605, 607, and 609 transmit data to each other and the base station 611 by means of radio communications, other embodiments may use other means to communicate, such as wired or optical connections.

The transmission power of the individual relays may even be decreased if more relays closer together are deployed. Number of relays can be a trade off with transmission power, and hence a system can be tailored to individual application needs. In certain embodiments, for example to reduce costs, the transmitters of the relays can be identical to the transmitters of the tags.

In the illustrated example of FIG. 5A, a tag 603 is programmed to provide a position information signal to relay 605 and 607. The tag 603 is too distant from relay 609 for its signal to reach the relay 609. Relay 605 is programmed to transmit the tag information to the base station and other relays. Relay 605 however, does not have enough signal strength to reach the base station 611. Relay 607 likewise does not have enough signal strength to reach the base station 611. Accordingly, relay 607 is programmed to accept information about the position of tag 603 from both relay 605 and from the tag 603 itself. Relay 607 then provides the information about tag 603 to relay 609, which is programmed to then provide the information regarding the position of tag 603 to the base station 611. In this manner, by using a networking protocol within the relays, the position information of the tag can be communicated from a farther distance to a base station than when non-networked relays are used. The trade off for the added robustness and distance that the networking protocol provides is an increasing complexity and computational burden within the relays.

Figure 5B:
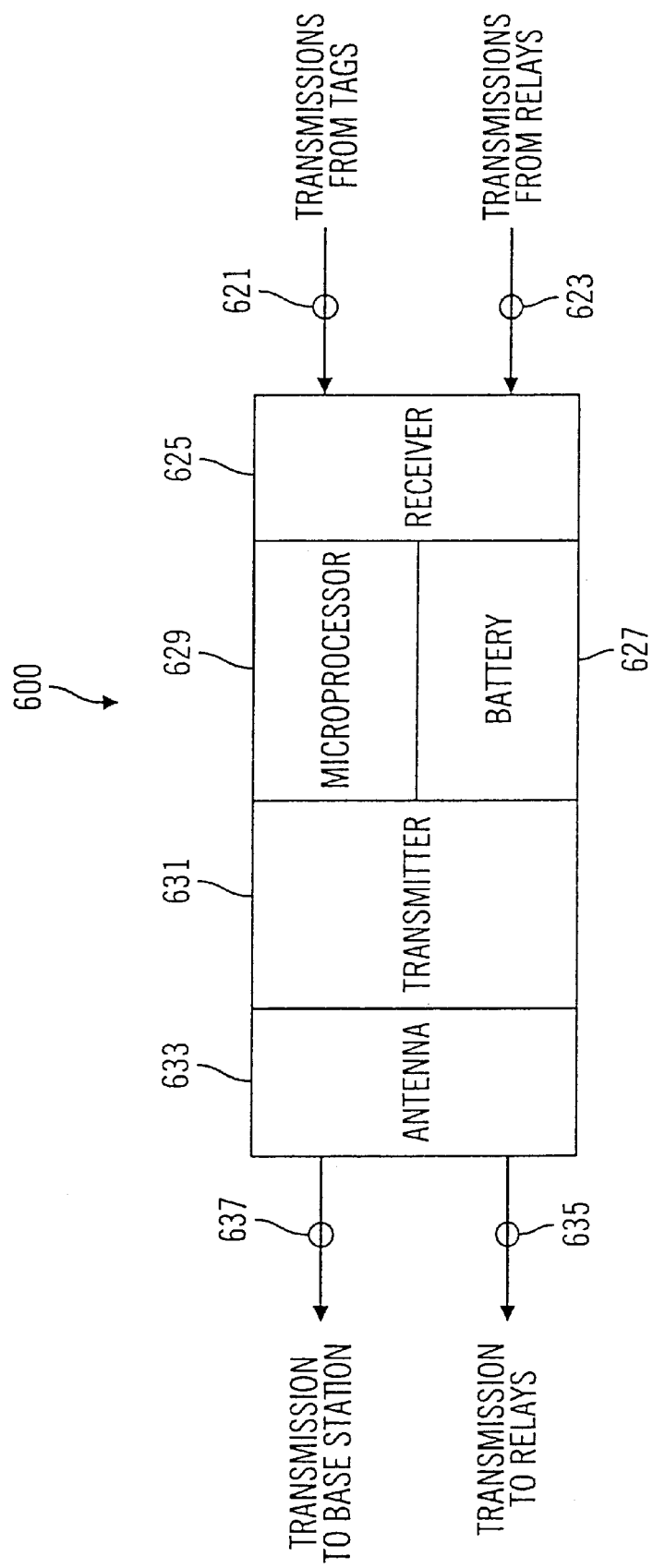
FIG. 5B is a generalized block diagram of a relay as may be used with the embodiment of the invention illustrated in FIG. 5A.

FIG. 5B is a generalized block diagram of a relay as may be used with the networked INS system embodiment illustrated in FIG. 5A. The relay in FIG. 5B includes a receiver 625, a power source 627, a microprocessor 629, a transmitter 631 and an antenna 633. The receiver 625 receives signals 621 transmitted from RF tags 603, and also receives signals 623 transmitted from other relays. A microprocessor 629, powered by a power source such as a battery 627, is programmed to accept information from signals 621 and 623. The microprocessor 629 is further programmed to aggregate the information, to eliminate duplicate information from tags and relays, and to format the information for transmission by a transmitter 631. The transmitter 633 then transmits the aggregate information as a signal 637 to a base station and also provides a signal 635 to other relays. Transmission 635 and transmission 637 may be the same transmission, thus simpifying the relay 600 transmission protocol. Both transmissions may utilize antenna 633. The antenna 633 may also be used by receiver 625 to receive transmissions 621 and 623.

Alternative RF Tag Embodiment

Figure 6:
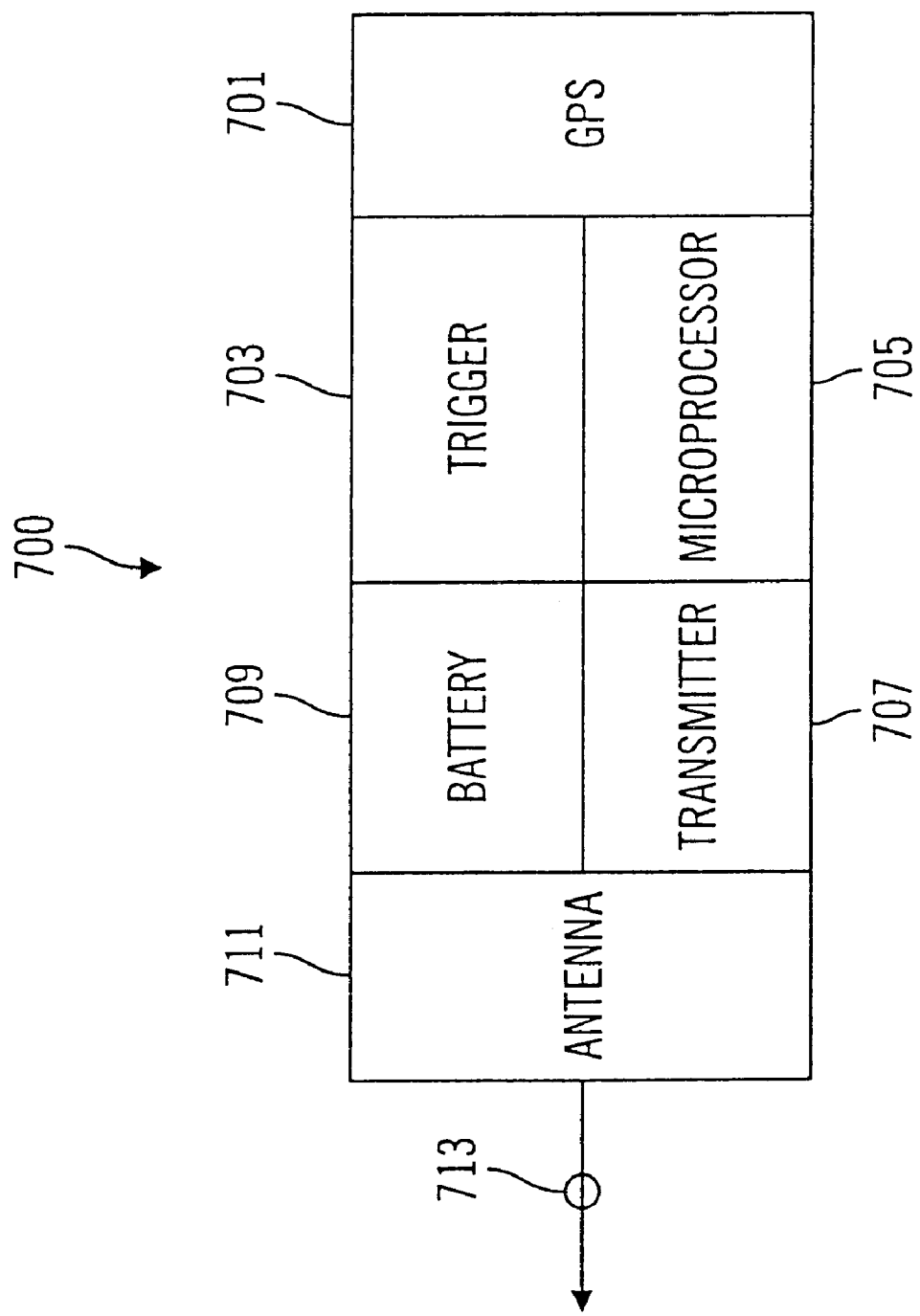
FIG. 6 is a generalized block diagram of an alternate embodiment of a tag, as may be used with an embodiment of the invention wherein the tag determines its own position.

FIG. 6 is a block diagram of an alternate embodiment of a RF tag 700 as may be used with embodiments of the invention in which the tag determines its own position. Such a tag may be used instead of a tag containing an inertial navigational system. The RF tag 700 contains a GPS receiver 701, a trigger 703, a microprocessor 705, a power source, such as a battery 709, a transmitter 707 and an antenna 711. The tag 700 is activated by actuation of the trigger circuit 703 as discussed above. The GPS receiver 701 produces absolute location information, which is provided to the microprocessor 705. The microprocessor 705 is programmed to format the information provided to it by the GPS Module 701 along with the identifying number of the RF tag (not shown) and then transmit the formatted information, using transmitter 707 and antenna 711, in a signal 713 for reception by the relays.

Multi-Path Interference

Figure 7:
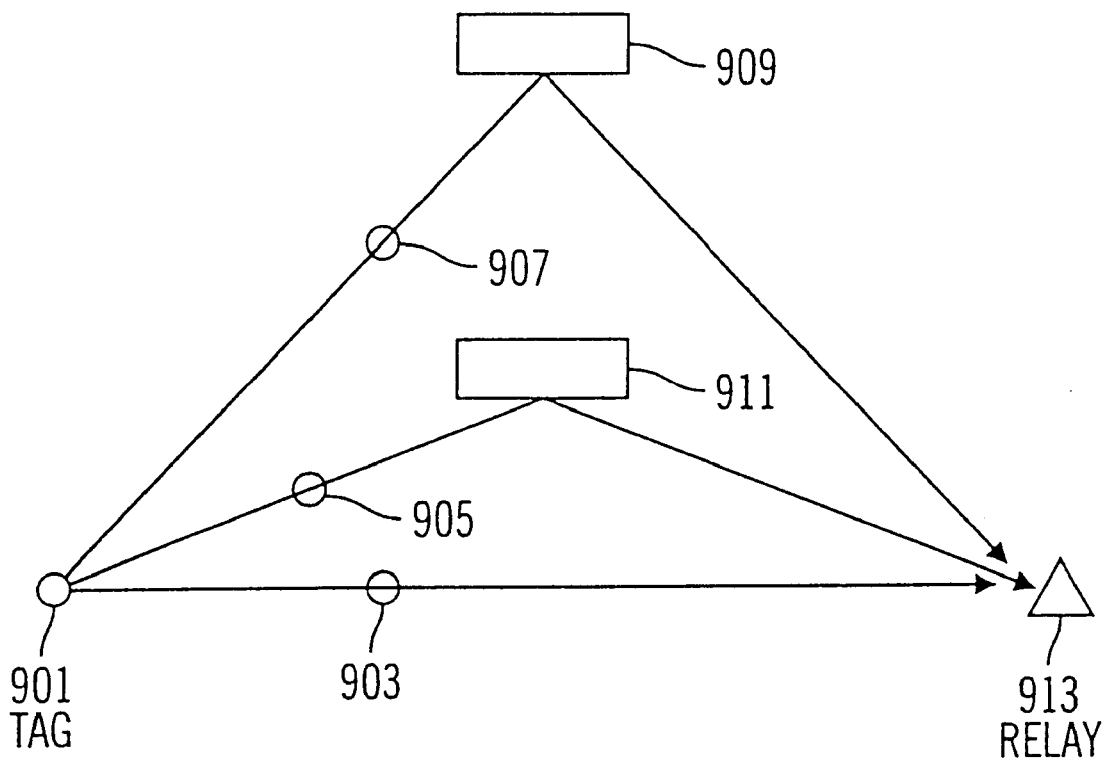
FIG. 7 is a generalized graphical illustration of a multi-path problem addressed by embodiments of the present invention.

Systems as described above which employ multiple tags and relays can be susceptible to multi-path interference. FIG. 7 is a generalized graphical illustration of a multi-path problem, as may be encountered with respect to RF tags and relays. In the illustrated embodiment, an RF tag 901 emits a signal omni-directionally. The signal is detected by a relay 913. The signal, however, travels not only in a direct path 903 between the RF tag 901 and the relay 913, but also indirect paths such as through paths 905 and 907, wherein the signal from the RF tag 901 is reflected and diffracted from various structures 909 and 911 in the environment.

The multi-path problem results in delayed reception of "copies of" the signal emitted by RF tag 901 being received at relay 913. To accurately measure the distance between a RF tag 901 and a relay 913, and hence determine the position of the RF tag 901, the relay must look for the first occurrence of the signal from the RF tag 901 and ignore other reception times in which the same tag signal is received, even if the first reception occurrence is not the strongest, as might be the case if the direct path is blocked by a object in the environment.

Because of the desirability of achieving ranging precision, preferred embodiments may employ spread spectrum modulation techniques. In particular direct sequence spread spectrum systems modulate a spreading code onto each bit of data, which may then be detected at lower power levels and in higher interference environments than narrowband transmissions. A spreading signal can then modulate a carrier signal by means of, for example, a binary phase shift keying modulator.

Transmission and Reception of Data

Figure 8A:
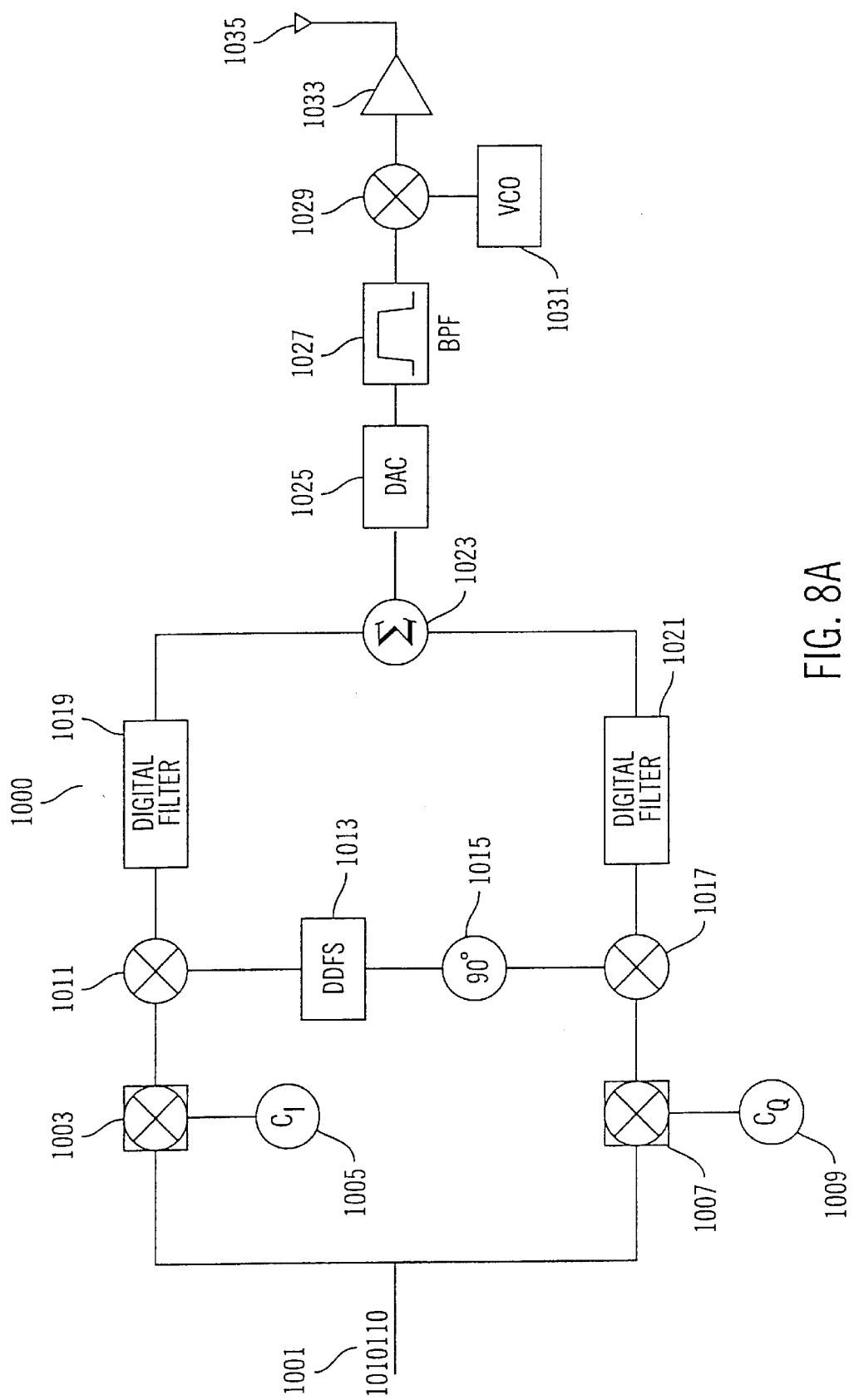
FIG. 8A is a generalized block diagram of a digital binary phase shift keying transmitter with digital in phase and quadrature spreading codes, as may be used within an RF tag according to embodiments of the invention.

FIG. 8A is a generalized block diagram of a digital binary phase shift keying (BPSK) transmitter circuit 1000 as may be used with an RF tag, in accordance with an embodiment of the invention. A digital signal 1001 is accepted by the circuit 1000. The digital signal 1001 is accepted into spreading units 1003 and 1007. Spreading unit 1003 accepts the digital signal 10001 and spreads it with the spreading code Ci 1005 representative of the in phase spreading code. The digital signal 1001 is also accepted by spreading unit 1007 which spreads the digital signal 10001 with a code Cq 1009 which is representative of the quadrature spreading code. The spread signal from spreading unit 1003 is coupled into a multiplier 1011 where it is multiplied by a digital representation of a sign wave from a direct digital frequency synthesizer 1013, and then further provided to digital filter 1019. Digital filter 1019 shapes and filters a digital signal provided by the output of multiplying unit 1011. The output of spreading unit 1007, which spreads the digital signal 1001 with a quadrature code Cq 1009, is coupled into a digital multiplier 1017. The output of the direct digital frequency synthesizer 1013 is shifted by 90 degrees in a phase shift unit 1015 and then coupled into the digital multiplier 1017. Within digital mulitiplier 1017, the spread quadrature signal coupled from spreading unit 1007 is multiplied by the direct digital frequency synthesizer signal provided by unit 1013 after being shifted by 90 degrees in phase-shifter 1015. The output of the digital multiplier 1017 is then further coupled into a pulse shaping digital filter 1021. The output of digital filter 1019 is then coupled into a summation unit 1023 and the output value from digital filter 1021 is subtracted from the output of digital filter 1019 in summation unit 1023. The output of the summation unit 1023 is further coupled into a digital analog converter 1023 which is then filtered in a band pass filter 1027 to remove any undesirable frequency components and further coupled into a mixer 1029. The mixer 1029 mixes the output of the band pass filter 1027 with a Voltage Controlled Oscillator (VCO) signal 1031. It is important to note that the VCO 1031 need not be a crystal controlled frequency source though a crystal controlled frequency source could be used. Eliminating a crystal within the VCO 1031 can significantly lower the cost of the circuit embodiment illustrated in FIG. 8A. The output of the mixer 1029 is then further coupled into an RF amplifier 1033 and then further coupled into an antenna 1035 where it is transmitted, in the present embodiment by radio transmission. Those skilled in the art will note that many variants to the transmission scheme illustrated in FIG. 8A are possible. For example, if a circuit were desired that reduced the cost of the circuit illustrated in Figure A, the Digital to Analog Converter (DAC) 1025 could be eliminated with minimal modifications at the cost of some performance degradation. Although the performance would be degraded somewhat by the elimination of the DAC 1925, the cost of the overall circuit would be lessened.

Figure 8B:
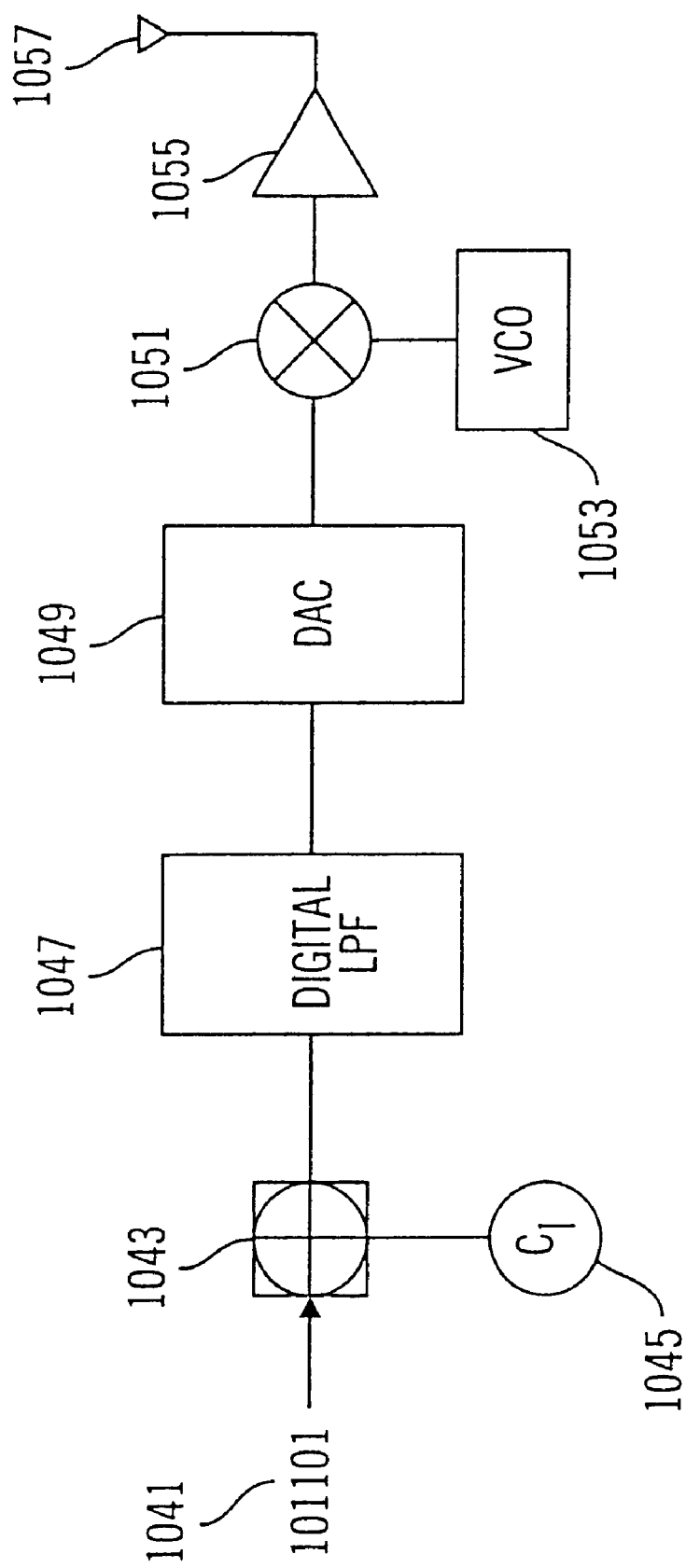
FIG. 8B is a generalized block diagram of a digital direct transmitter with a digital spreading code as may be used in RF tags according to further embodiments of the invention.

In further embodiments, the digital BPSK modulator may be replaced by a lower performance, but simpler modulator, as illustrated in FIG. 8B. FIG. 8B is a generalized block diagram of an example of a digital direct transmitter, with an in-phase digital spreading code only, as may be used RF transmission in accordance with an embodiment of the present invention. The direct transmitter illustrated in FIG. 8B accepts a digital bit stream 1041 which is then coupled into a spreading unit 1043. The digital bit stream 1041 is then spread using a spreading code Ci 1045 within spreading unit 1043. The output of spreading unit 1043 is then coupled into a digital low pass filter 1047. The digital low pass filter eliminates any unwanted high frequency components and further provides the filtered signal to the digital to analog converter 1049. The digital to analog converter converts the digital signal from the output of the digital low pass filter 1047 to an analog value. The analog output of the digital to analog converter (DAC) is then mixed in mixer 1051 with a signal provided by a voltage control oscillator 1053. The output is then coupled into an RF amplifier 1055 and subsequently provided to an antennae 1057 for broadcast. It is important to note that the transmitter embodiment of FIG. 8B, while being of somewhat less performance then the embodiment of FIG. 8A, can provide a less expensive solution for transmitting of the RF tag signal. Also important to note is that the voltage control oscillator 1053 of FIG. 8B need not be a crystal control type oscillator, thereby saving the cost of a crystal in the transmitter of FIG. 8B. The system of FIG. 8B, while less efficient then the system of FIG. 8A, is simpler than the system of FIG. 8A and may be fabricated with less components and so may be employed in systems in which tag size and cost are to be minimized.

Because embodiments of the invention provide for multiple RF tags which transmit in a non-synchronized fashion interference between transmissions by the tags may occur. Accordingly, further preferred embodiments of the invention may employ techniques for minimizing interference effects. For example, FIG. 9 is a generalized block diagram of circuitry for minimizing interference between tag transmissions.

Figure 9:
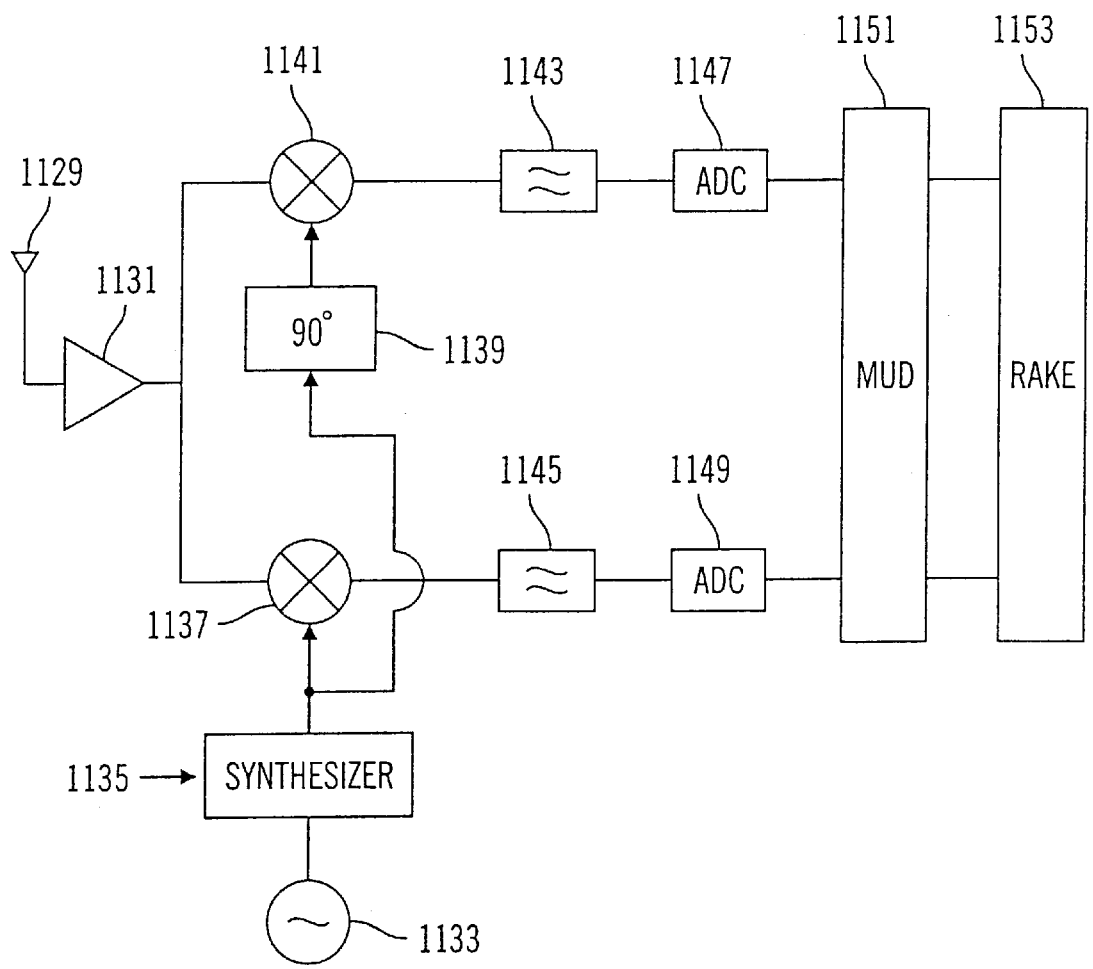
FIG. 9 is a generalized schematic diagram of a relay receiver, according to a further embodiment of the invention.

The circuitry illustrated in FIG. 9 represents receiver circuitry as may be found in relays in embodiments of the invention. With reference to FIG. 9, an RF tag signal is received by an antenna 1129 and provided to an amplifier 1131. Assuming for the purpose of illustration that the signal from the RF tag is a spread spectrum signal, which has been modulated using binary phase shift keying techniques, the output of the amplifier 1131 is provided to a pair of mixers 1141 and 1137.

Mixer 1137 mixes the incoming amplified signal from the output of amplifier 1131 with a synthesized signal 1135 generated by an oscillator 1133. The synthesizer output is delayed by 90° and provided to a second mixer 1141, where it is mixed with the output of the low noise amplifier 1131. The output of mixers 1137 and 1141 are provided into filters 1145 and 1143, and then converted to digital signals in analogue-to-digital converters (ADCs) 1149 and 1147, respectively. The output of ADCs 1149 and 1147 are then provided to a multi-user discriminator circuit or MUD circuit 1151 and then further provided to rake circuit 1153.

Rake circuitry is well known in the art of spread spectrum signal processing. Rake receivers are receivers that essentially "rake" as much signal power as possible from the signal environment. Rake receivers use energy in signal echoes by integrating information from the main path of a signal along with delayed signal propagation paths to increase the signal strength received and to remove echotype distortion. Rake receivers are commonly used in CDMA cellular phone systems. Signals enhanced by the multi-user detector (MUD) 1151 are provided into the rake circuit 1153. The MUD circuit 1151 attempts to improve a received desired signal by subtracting out non-desired received signals from the composite received wave form containing all signals.

Multiple Signal Environment

Figure 10:
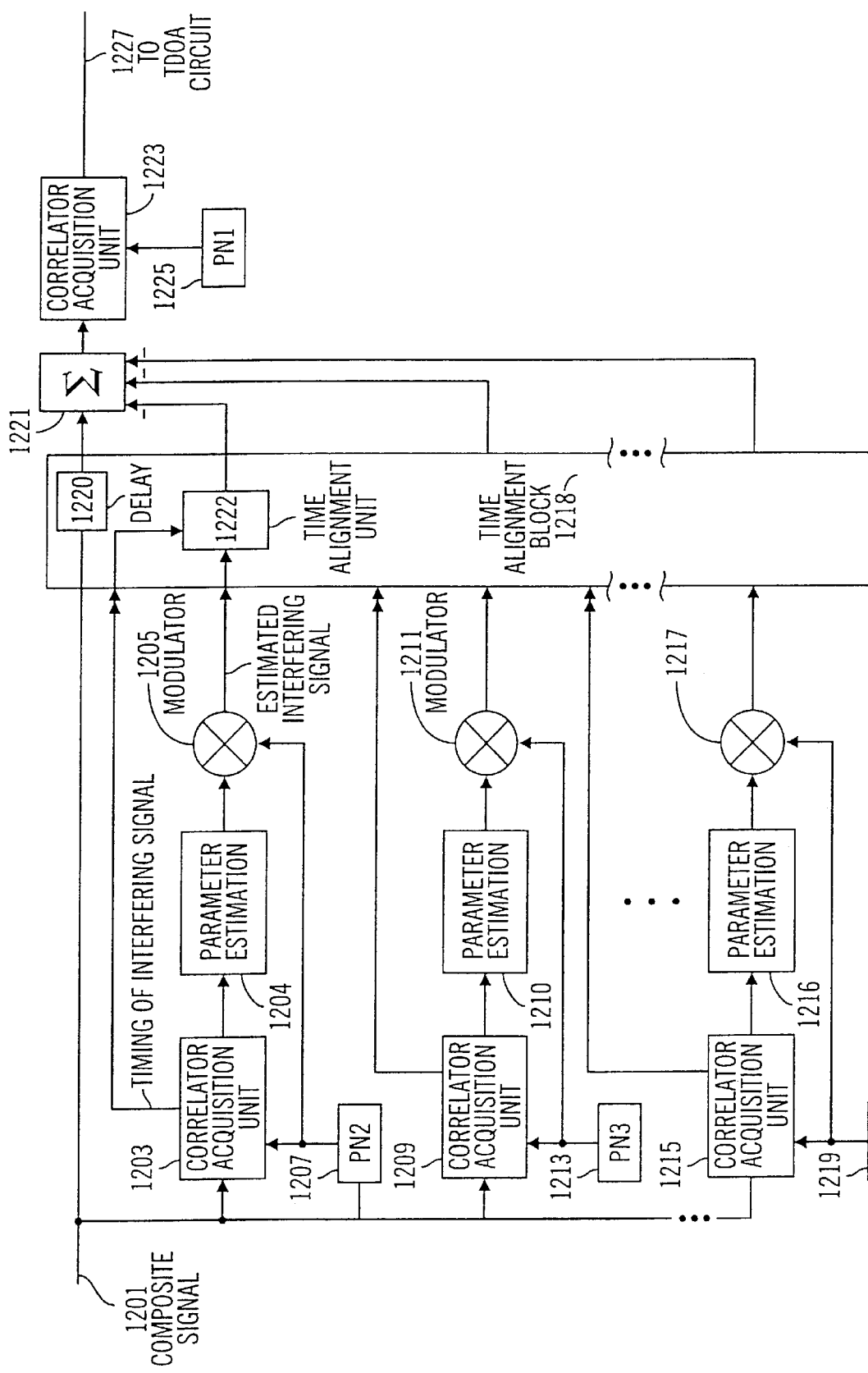
FIG. 10 is a generalized block diagram of multi-user discriminator as may be used with embodiments of the invention.

A generalized block diagram of an example multi-user detection (MUD) unit is depicted in FIG. 10. While FIG. 10 illustrates one example MUD configuration, those skilled in the art will recognize that a variety of alternative methods have been employed in accomplishing multi-user detection and that alternative techniques may also be suitable. The multi-user detection illustrated in FIG. 10 is referred to as a subtractive multi-user detector. Subtractive multi-user detection optimally decodes a coded information signal embedded in many other overlapping signals, which make up a received summation or composite signal. FIG. 10 illustrates one signal's reception (signal spread by PNI) being enhanced by the MUD. The enhancement of a single signal is a simplification for illustrative purposes. In actuality, multiple signals from a plurality of tags would be enhanced by the MUD. Because the MUD unit can subtract out interfering signals in order to discriminate a target signal, the system channel capacity is increased and more tags can be added in a given area.

In FIG. 10 a spread spectrum composite signal 1201 is accepted by the MUD system 1202. Composite signal 1201 is then provided to the multi-user detector 1202. The composite signal 1201 is provided to the correlator acquisition unit 1203. The correlator acquisition unit 1203 correlates the incoming code with a particular pseudo-noise code designated as PN2 1207. The correlator acquisition unit by correlating PN2 code 1207 with the composite signal 1201 can determine the actual timing between the composite signal and the interfering pseudo-noise signal represented by spreading code PN2 1207. The correlator acquisition unit provides input to the parameter estimation block 1204. The parameter estimation block then estimates what the original signal was in terms of amplitude, data and the phase of the original signal. The result is that the parameter estimation block produces an estimated signal which is a estimated recreation of the original signal. The estimated signal is then coupled into the modulator 1205 and the estimated signal is modulated with this spreading code PN2 1207. The estimated recreated signal is then coupled from the modulator into the time alignment unit 1222. The time alignment unit 1222 accepts timing information from the correlator acquisition unit which is indicative of the timing of the estimated recreated interfering signal. The estimated recreated interfering signal is then delayed as appropriate in the timing alignment unit 1222 and then further coupled to a summation unit 1221. The composite signal also goes through a delay 1220 within the time alignment unit 1218. This delay is to compensate for the time, which the signal takes to travel in the path through the correlator acquisition unit 1203, parameter estimation unit 1204, modulator 1205 and time alignment unit 1222. The composite signal is then coupled into the summation unit 1221. In a similar manner correlator acquisition unit 1209 functions with PN code 3 1213 producing data for the parameter estimation unit 1210 which then recreates an estimated interfering signal which is then modulated by the modulator 1211 and coupled into the time alignment unit 1218. The interfering signal is then delayed similarly to the interfering signal in PN2. The result time aligned interfering signal is then coupled into the summation block 1221. This continues through any number of similar units accommodating NPN codes. The nth corelator acquisition unit 1215 accepts the composite signal 1201 and correlates it with the nth PN code 1219. The parameter estimation block accepts an input from the correlator acquisition unit thereby recreating the nth interfering signal which is then remodulated in the nth modulator 1217 and coupled into the time alignment unit. In similar fashion the recreated nth signal is coupled into the summation block 1221. The summation block 1221 subtracts all the estimated interfering signals from the composite signal thereby producing an output that is much cleaner than the composite signal 1201. The output of the summation block 1221 comprises the composite signal 1201 with all of the interfering signals subtracted out and only the signal containing the PN1 code remaining. The PN1 code 1225 is then correlated into correlation acquisition unit 1223. This is done to measure the time delay of arrival of the PN1 code 1225. The resulting output of the correlator acquisition unit 1223 is a time delay signal 1227 which is proportional to the time that the signal traveled between the RF tag which was transmitting using the PN1 code, and the relay which received the transmission.

Because, in the example embodiment, the signals are asynchronously transmitted, the decoding correlating units 1203, 1209, 1215 and also the composite signal may contain appropriate delay units. For example, if a composite signal contains two signals, a desired signal represented by PN1 and a undesired signal represented by PN2, and the transmission of PN2 precedes the transmission of PN1, the subtraction will not occur until the PN1 bearing signal is detected. Conversely, if the desired signal represented by PN1 is transmitted prior to the transmission of the nondesired signal PN2, the subtraction of the two signals must be synchronized so that the subtraction process begins only after the signal bearing code PN2 is detected. The delays may also be used to compensate for processing delays in the circuitry. An example of the subtraction process is illustrated in FIGS. 11A and 11B.

Figure 11A:
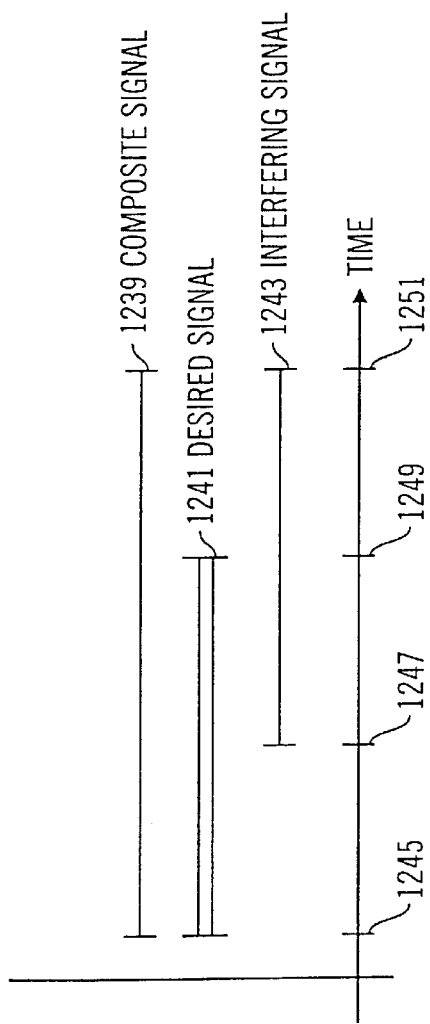
FIG. 11A is a graphic diagram of a composite signal made up of a desired signal and an interfering signal.

FIG. 11A is a graphical illustration of a composite signal made up of a desired signal and an interfering signal. The composite signal 1239 comprises the addition of the desired signal 1241 and the interfering signal 1243. The desired signal begins transmission at time 1245 and ends transmission at time 1249. The interfering signal begins transmission at point 1247 and ends transmission at point 1251. In order to extract desired signal 1241 from the composite signal 1239, the composite signal is decoded, beginning at point 1245, by correlating the composite signal with the PN code of the desired signal. At time 1247, the undesired interfering signal 1243 begins transmission. At time 1247, the interfering signal 1243 must be decoded by correlation with the PN code of the interfering signal and then subtracted from the composite signal. At time 1249, the desired signal terminates transmission, but the interfering signal is not terminated until point 1251. Therefore, to extract the desired signal 1241 from the composite signal 1239, the composite signal is correlated with the desired PN code between time 1245 and 1249, and the undesired interfering signal 1243 is estimated and subtracted from the composite signal between time 1247 and 1249.

Figure 11B:
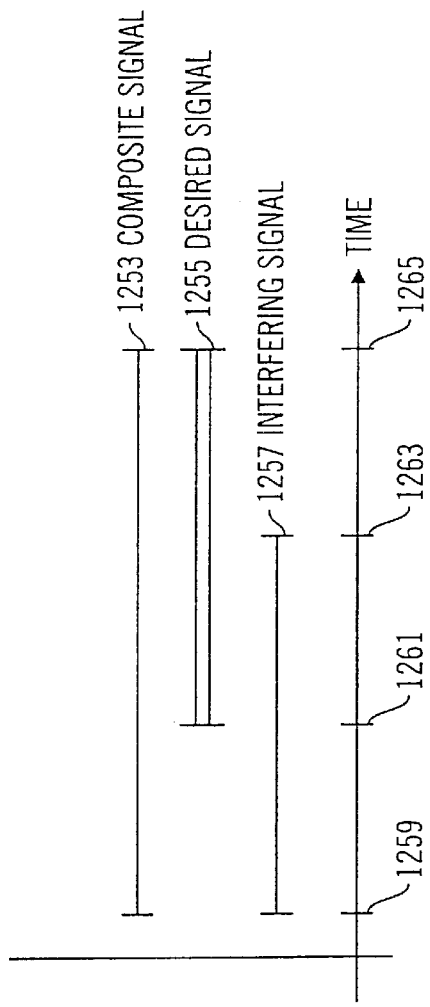
FIG. 11B is a graphic diagram of a composite signal made up of a desired signal and an interfering signal where an interfering signal is present before the arrival of a desired signal.
Figure 12A:
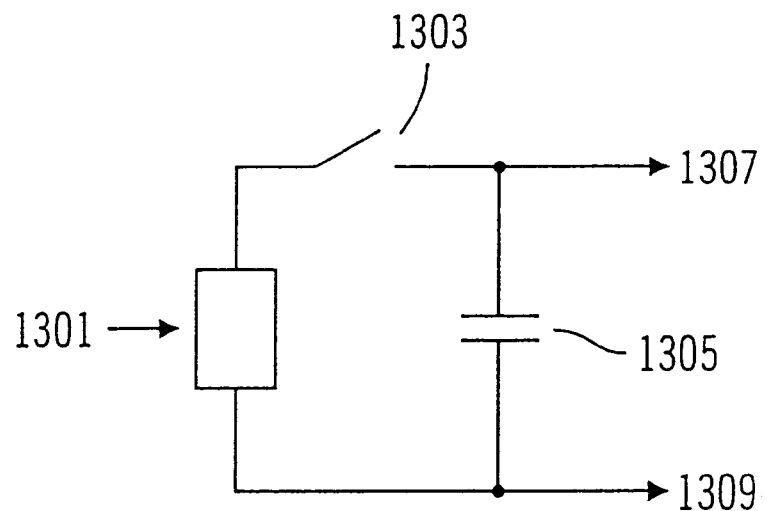
FIG. 12A is a generalized schematic diagram of a power system as may be used within RF tags in embodiments of the present invention.
Figure 12B:
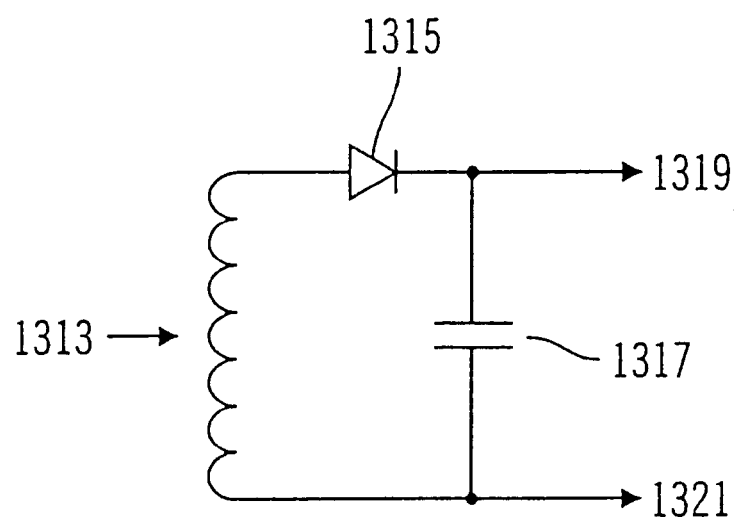
FIG. 12B is a generalized schematic diagram of a rechargeable power system for an RF tag as may be used with embodiments of the invention.

FIG. 11B illustrates the case where an interfering signal is present before the arrival of a desired signal. A composite signal 1253 is comprised of an undesired interfering signal 1257 added to a desired signal 1255. Between times 1259 and 1261 the composite signal is not composed of any component of the desired signal 1255. At time 1261 the transmission of the desired signal begins. At this time, the interfering signal which has been in the process of being decoded since time 1259. Its estimate is subtracted from the composite signal 1253. The subtraction process continues until time 1263, when the interfering signal terminates. At that time, the remainder of the composite signal and the remainder of the desired signal are identical. The timings illustrated in FIGS. 12A and 12B are illustrative simplifications of the timings that must be used in a MUD circuit in order to remove interfering signals from desired signals.

As those skilled in the art will recognize, the previous example has been simplified for purpose of clarity of illustration. In actual process, there may be a plurality of interfering signals which may need to be removed from a composite signal, in order to enhance the component of the composite signal which is the desired signal. In addition, in the present embodiment, the interfering signals as well as the desired signals, are signals from the RF tags. The transmissions from the RF tags may be generated without the use of a crystal clock, in order to minimize tag costs. Therefore the different RF tags may have different bit timing.

Synchronization

Receivers within the relays must receive transmission from other relays and tags with potential variations in timing and carrier frequency. In the case where precise timing elements, such as crystals within the tags, are not used, the relays need to synchronize tag signals having potentially large offsets in frequency and phase in both the transmitted data, for example the chipping rate of the spreading code, and the frequency of the carrier. Synchronization of a receiver time base to a frequency and phase timing of transmitted data is often referred to as timing synchronization or timing recovery. Synchronization of the receiver local oscillator output, for example the output of the synthesizer 1135 of FIG. 9, is often referred to as carrier synchronization or carrier recovery.

There are a number of techniques to efficiently synchronize to the time base and the received signal. These techniques may include, but are not limited to, serial correlators and match filters to acquire the timing of the transmitted pseudo-noise (PN) code used in direct sequence spreading of the tag transmissions, and delay locked loops, early-late gate correlators, and tau-dither loops for tracking the timing variations in the received PN code. The acquisition and tracking functions may be implemented as part of a correlator acquisition unit, such as 1203 illustrated in FIG. 10, to de-spread the interference signals as well as to provide timing information for time delay of arrival (TDOA) measurements.

There are a number of techniques to efficiently recover carrier synchronization, which recovers the phase and frequency of the carrier of the received modulated signal. These techniques include, but are not limited to open-loop estimation, Costas loop and squaring loop methods.

The correlating and decoding units illustrated in FIG. 10, 1203, 1209 and 1215, in order to compensate for the variable bit timing of the RF tags, may also comprise circuitry that memorizes the time period of the individual previous interfering signal transmissions. If all of the RF tags had clocking signals that were in perfect frequency synchronization, there would be no difference in time period of transmission from the RF tags. Because the clocking of the RF tags may not be crystal controlled (for example, in tag embodiments designed for minimal tag cost), the length of transmission time from each RF tag may vary, even though the same amount of data is being transmitted.

Preferred embodiments of multi-user detectors will compensate for the differing transmission periods, by timing each transmission period, as it is received, and then decoding the following transmission periods using the timing of the previous transmission period as the expected period. In this way, the drift in the period of RF transmissions from the RF tags, which may be due to the lack of precise crystal time-based frequency synchronization within the tags, can be tracked and memorized. Since frequency drift between successive transmission is likely to be small, the MUD detector can properly function, even though the period of transmission from all RF tags may be continually drifting. In addition by memorizing several of the previous transmission periods from an RF tag a future transmission period can be extrapolated. The period of the transmission can then be accurately predicted at the time it is received. Increased accuracy in the prediction of the transmission periods will increase the effectiveness of both the MUD and Rake circuits (see FIG. 9) because by accurately predicting the transmission periods, the chipping rate of the tags' spread spectrum transmitters can be computed and the correlating and decoding units can synchronize the correlators using a correct chipping rate. By using the correct chipping rate, the accuracy of correlators in the MUD unit is enhanced.

RF Tag Power Supply

FIG. 12A is a generalized schematic diagram of an example of a power source for an RF tag, according to an embodiment of the present invention. In the illustrated power embodiment, a battery 1301 is connected to a capacitor 1305, through a switch 1303. The capacitor 1305 then connects to the remainder of the RF tags power circuitry, through contacts 1307 and 1309.

It is known that certain types of batteries have reduced performance characteristics when subjected to high-peak loads. In embodiments where such batteries are employed, the circuitry illustrated in FIG. 12A may also be employed. In FIG. 12A, the capacitor 1305 is charged by connection through the switch 1303 to the battery 1301. By knowing the internal resistance of the battery 1301 and selecting the capacity of capacitor 1305, a charge rate of the capacitor 1305 can be selected so that the current drained from the battery 1301 does not exceed specified peaks. Battery 1305 can then be used to power the circuitry of the RF tag during periods of transmission, which are the periods requiring the most consumption of power by the RF tags. Other power sources, including, but not limited to a solar cell array, or motion generators similar to those found in self-winding watches, might be employed to provide power to the RF tag.

In addition, the tag can conserve power by transmiting only during periods when it detects activity, such as with a motion detector.

FIG. 12B is a generalized schematic diagram of an example of a rechargeable power source for an RF tag as may be used with embodiments of the invention. In FIG. 12B, an antenna coil 1313 is coupled to a capacitor 1317, through a diode 1315. The capacitor diode and the inductance of the antenna 1313 form a resonant circuit. A resonant circuit is responsive to a particular radio frequency. The circuit of FIG. 12B is coupled into the RF tags circuitry through contacts 1319 and 1321. Contacts 1319 and 1321 also may be switched. The circuitry of FIG. 12B can be used to accept a high-frequency electromagnetic signal. If the high-frequency electromagnetic signal is of such a frequency, for example, at or near the resonant frequency of the 1313, 1315, 1317 series circuit, then capacitor 1317 will be charged.

Such a circuit may be used in rechargeable versions of the RF tags. Such RF tags may be placed on objects to be tracked and then activated as needed. Such RF could lie dormant until they were powered from a suitable frequency electromagnetic signal provided by an external source. The tags then could transmit their numeric identifiers to relays which would then locate the position of each tag, for example, in a manner as described above.

By using certain identifiers to represent certain types of goods, inventory tracking systems, which are superior in many aspects to current bar code tracking systems, could be fabricated. Bar code tracking systems have the disadvantage that inventory must be visible to the bar code reader. Such inventory tracking systems traditionally require a person with a bar code reader to manually place the reader adjacent the bar code to scan the bar code. In an inventory system comprising a RF tag with a rechargeable power supply as depicted in FIG. 12B, the tag could be activated merely by causing the tag to be irradiated with the proper frequency electromagnetic radiation.

In embodiments employing networked relays as described above, the networked relays could also have such a rechargeable power system similar to that shown in FIG. 12B. By irradiating an area containing the relays and tags with the proper frequency radiation, an electronic inventory of an area could be completed in relatively short order, as compared to bar coding systems that require manual placement of readers adjacent the bar code of each inventoried item. Embodiments of the present invention would also have the advantage over bar coding systems in that not only could the products be identified by the numerical identifier transmitted by each tag, the location of the item could be virtually instantaneously determined.

By combining the rechargeable RF tags and relays with the electronically programmable identification numbers within the RF tags, an inventory system comprising relatively inexpensive, reusable and reprogrammable tags could be fabricated. In addition, in order to eliminate the requirement of a receiver within the RF tags, instead of reprogramming the tags, a table look-up system could be implemented in the base station units. In such a system, the RF tags could be reused and reattached to differing inventory items.

Power consumption is a critical issue in determining just how long a tag or relay, if it is powered internally, will continue to operate. By power cycling parts of the tag and the relay, that is turning off circuitry when not in use, the power consumption can be reduced and operating life extended.

Additionally algorithms can be employed extending the time between tag transmissions as the power within the relay or tag diminishes. The increasing time between transmissions will not only save power it will provide information that the tag's power supply is diminishing. Further embodiments can incorporate a sleep mode wherein the tags will transmit for a period after receiving a triggering pulse, then after a predetermined period cease transmitting until another trigger pulse is received. In the sleep mode the amount of time that transmissions will be permitted before the relay or tag goes to sleep can shorten as the power in the relay or tag diminishes. In addition to or instead of, shortening the time that the tag or relay will permit transmissions as the power diminishes the tag can increase the time between its asynchronous broadcasts.

In one exemplary embodiment the pseudo-random numbers that are generated by the tags for determining transmission intervals are multiplied by a power saving constant. The power saving constant is a function of the amount of power remaining within the tag. In this mode the tag will continue to transmit at pseudo-random intervals, but on the average the pseudo random intervals will increase as the power in the exemplary tag diminishes.

A similar power saving mode can be implemented within relays. In addition the relays can utilize a power saving mode in which the transmission can be based not only on the amount of power remaining in the relay, but additionally how many transmissions it receives. This power saving mode will allow the relay to transmit less as the intervals between tag transmissions increase as the tag power diminishes, thereby allowing the entire system to degrade in a more graceful manner than if the power saving modes had not been implemented. Power saving measures, as just described, can prolong the useful life of a system which operates on internal power.

Variable Power Relays

Figure 13:
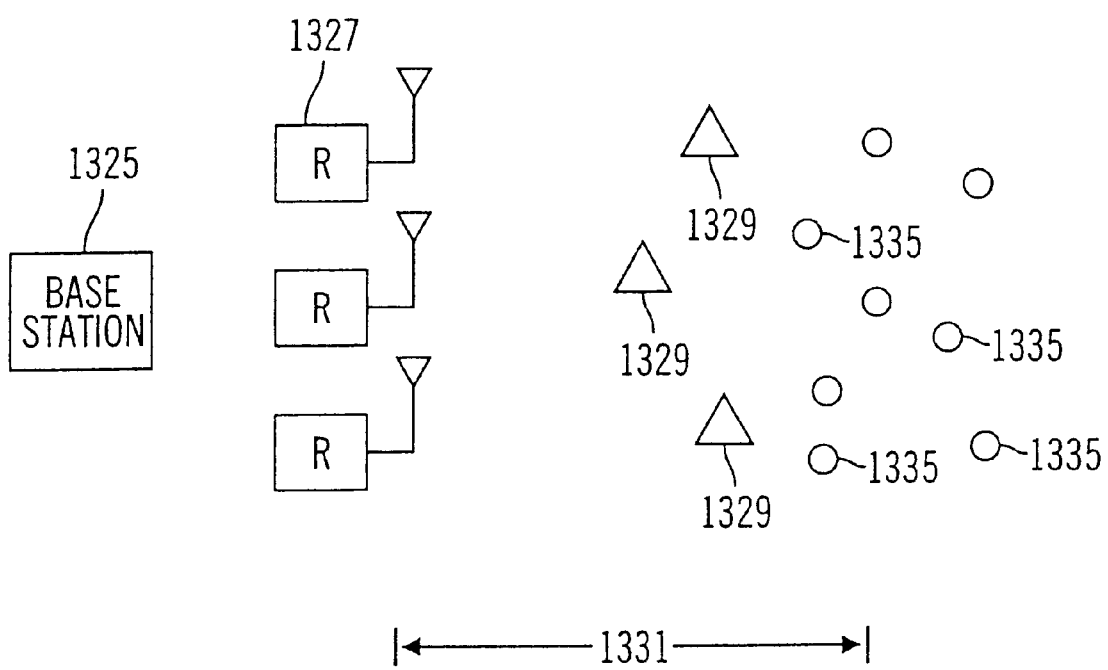
FIG. 13 is a generalized graphical illustration of a system embodiment showing the use of relays with varying range capabilities.

FIG. 13 is a generalized block diagram illustrating the use of varying power relays according to an embodiment of the invention. In FIG. 13, RF tags 1335 could communicate with relays 1329. If, however, the distance between the tags and the base station 1325 were a distance 1331 which is relatively far from the tags, more powerful relays 1327 could be used. Such higher power relays 1327 may be provided with, for example directional antennas or more sensitive receiver circuitry to receive transmissions from the RF tags 1335. In a further implementation, relays 1327 might receive transmissions from intermediate relays 1329, which in turn receive transmissions from the RF tags 1335. By creating successive layers of relay systems, the scope of the RF tag coverage could be increased from a local tracking system to a wide area tracking system.

The foregoing descriptions of embodiments of the present invention are described for the purpose of illustration and description of aspects of the invention. It is not intended to limit the invention to the implementations described. The embodiments described are not exhaustive in providing a description of the form and substance of the invention and variations, modifications, and a variety of implementations are possible in light of the preceding teachings. Therefore, it is intended that the scope of the invention be limited not by this detailed description, but rather by the claims appended hereto.

What is claimed is:

1. A system for tagging and locating objects passing through a general area comprising:
   a plurality of tags transmitting signals containing a tag identifier;
   a dispenser for deploying the plurality of tags to a corresponding plurality of locations over the general area, the deployed tags being in locations within the general area such that at least one of the tags is likely to contact and become attached to at least one object upon the at least one object passing through the general area;
   a relay for accepting tag transmissions from the plurality of tags, processing information contained in the tag transmissions within a computing element and for transmitting information related to the tags; and
   a base station for receiving a transmission from at least one relay and for providing object location information from the transmission.

2. A system as in claim 1 wherein the tags commence transmitting signals containing a tag identifier upon receipt of a trigger signal.

3. A system as in claim 2 wherein the dispenser, which dispenses the tags, also provides the trigger signal.

4. A system as in claim 1 wherein the tags transmitting signals transmit spread spectrum signals.

5. A system as in claim 1 wherein the tags transmitting signals transmit the signals at pseudo-random intervals.

6. A system as in claim 1 wherein the relay further comprises a precision time element for determining the time of arrival of the signals transmitted from the tags in order to determine the location of the tags.

7. A system as in claim 6 wherein the precision time element comprises a Global Positioning System receiver.

8. A system as in claim 1 wherein the relay further comprises:
   a receiver for receiving transmissions containing information, related to the tags, from at least one further relay; and
   a transmitter for transmitting information, related to the tags, to at least one further relay.

9. A system as in claim 1 wherein the relay employs a networking protocol within the computing element for receiving information from other relays and for aggregating information received from the plurality of tags with information received from other relays.

10. A system as in claim 1 wherein the networking protocol routes the information received from the plurality of tags and other relays.

11. A system as in claim 9 wherein the networking protocol within the computing element further disseminates the aggregated information to other relays.

12. A system as in claim 9 wherein the networking protocol within the computing element coordinates processes for determining time delay of arrival for the information received from the plurality of tags and the other relays.

13. A system as in claim 1 wherein the dispenser deploys the plurality of tags in a corresponding plurality of pseudo-random locations.

14. A system as in claim 1 wherein the base station is mobile.

15. A system as in claim 1 wherein the dispenser deploys the plurality of tags utilizing an explosive charge.

16. A system as in claim 1 wherein the dispenser deploys the plurality of tags utilizing a pneumatic impulse.

17. A system as in claim 1 wherein the relay is located at a pseudo-random location.

18. A system as in claim 1 wherein the dispenser deploys the plurality of tags in specific locations within the general area.

19. A system as in claim 1 wherein the plurality of tags resemble natural objects.

20. A system as in claim 1 wherein the base station controls an automated weapon guidance system for guiding weapons toward the object location.

21. A system as in claim 1 wherein the base station tracks the location of inventory.

22. A system as in claim 1 wherein the base station tracks the location of packages.

23. A system as in claim 1 wherein the dispenser deploys the plurality of tags upon activation by a proximity sensor.

24. A system as in claim 1 wherein the plurality of tags become affixed to proximate objects by means of at least one of an adhesive material, attaching hook, and magnetized material.

25. A system as in claim 1 further comprising:
   a plurality of relays for accepting the transmissions from the plurality of tags;
   means for storing time of arrival of the transmissions at the plurality of relays;
   means for receiving the time of arrival of the transmissions from the plurality of relays;
   means for determining the position of at least one relay; and
   means for determining the position of the tag by computing the time delay of arrival of the transmissions at the plurality of relays and the position of the at least one relay.

26. A system as in claim 25 wherein the means for determining the position of at least one relay comprises using a Global Positioning System to determine the position of the at least one relay.

27. A system as in claim 25 wherein the means for determining the position of at least one relay comprises means for manually programming the position into the at least one relay.

28. A system as in claim 25, further comprising:
means for decoding Global Positioning System data contained in the transmissions.

29. A system as in claim 25, further comprising:
means for providing Inertial Navigational System information from at least one tag; and
means for computing a position of the tag by calculating movement, using the Inertial Navigational System data, of the tag from an initial tag position.

30. An apparatus for transmitting a signal containing an identifier the apparatus comprising:
a power source for providing power to the apparatus;
a receiver for receiving a signal containing an initial position of the apparatus from a dispenser which dispenses the apparatus;
a computing unit programmed to determine a location of the apparatus;
an antenna; and
a transmitter coupled to the antenna for transmitting a signal containing an identifier and information corresponding to the determined location.

31. An apparatus as in claim 30 wherein the computing unit performs a power cycling of circuits not in use during the time the signal is not being transmitted.

32. An apparatus as in claim 30 wherein the power source comprises a battery and a switched capacitor, the switched capacitor for reducing the peak current drain of the battery.

33. An apparatus as in claim 30 wherein the power source comprises a power receiving circuit for receiving power in the form of radio frequency (RF) energy coupled into the power source.

34. An apparatus as in claim 30 wherein the transmitter is a spread spectrum transmitter.

35. An apparatus as in claim 30 wherein the computing unit is programmed to begin transmission upon the receipt of a trigger signal.

36. An apparatus as in claim 30 wherein the computing unit is programmed to begin asynchronous transmission upon the receipt of a trigger signal generated by the dispenser which dispenses the apparatus.

37. An apparatus as in claim 30 wherein the transmitter generates the transmit signal using a non crystal locked time base.

38. An apparatus as in claim 30 wherein the apparatus further comprises a Global Positioning System unit and transmits a signal derived from the Global Positioning System unit.

39. An apparatus as in claim 30 wherein the apparatus further comprises an Inertial System Navigation unit and transmits a signal derived from the Inertial Navigation System unit.

40. A system as in claim 31 wherein the information is routed to the base station.

41. A system as in claim 31 wherein the information is routed to other relays.

42. An apparatus as in claim 30 wherein the computing unit is further programmed to control the timing of the transmission of the signal.

43. A method for locating objects the method comprising:
providing a tag unit for transmitting a first signal containing identifying information, the tag unit comprising a computing unit which is programmed to accept positioning coordinates of the tag unit from a dispenser, which dispenses the tag unit;
receiving the first signal containing identifying information in a relay unit;
deriving, from the first signal, information concerning a location of the tag unit;
transmitting a further signal, from the relay unit, containing the derived information concerning the location of the tag unit;
receiving the further signal in a tag location determination unit; and
processing the further signal within the tag location determination unit to derive the location of the tag unit.

44. A method as in claim 43 wherein receiving and processing the further signal in a tag location determination unit comprises receiving and processing the further signal in a base station.

45. A method as in claim 43 wherein receiving and processing the further signal in a tag location determination unit comprises receiving and processing the further signal in another relay unit.

46. A method as in claim 43 wherein transmitting the first signal further comprises transmitting at pseudo-random intervals.

47. A method as in claim 43 wherein transmitting the first signal and the further signal further comprises transmitting using spread spectrum techniques.

48. A method as in claim 43 wherein deriving, from the first signal, information concerning the location of the tag unit further comprises using a Global Positioning System receiver to derive the location of the tag unit.

49. A method as in claim 43 wherein deriving, from the first signal, information concerning the location of the tag unit further comprises:
decoding Inertial Navigational System information from the first signal; and
computing the location by calculating the movement, using the Inertial Navigation System data, of the tag from a previous tag location.

50. A method as in claim 43 wherein deriving, from the first signal, information concerning the location of the tag unit further comprises decoding Global Positioning System data provided by the tag in the first signal.

51. A method as in claim 43 wherein processing the further signal within the base station unit to derive a location of the tag unit comprises computing the location of the tag unit using the time delay of arrival of the first signal at a plurality of relay units, and the locations of the relay units.

52. A method for propagating relay locations within an array of relays, comprising:
providing location information to each relay within a first group of relays within the array;
transmitting signals containing the location information from each relay within the first group of relays to each relay within a second group of relays within the array; and
determining a location of each relay within the second group of relays based on the location information received from each relay within the first group of relays;
wherein each relay within the second group of relays determines its own location.

53. The method recited in claim 52 wherein determining a location of each relay within the second group of relays comprises determining a time of arrival of the signals at each relay within the second group of relays and computing a time delay of arrival of the signals.

54. The method recited in claim 52, further comprising:
transmitting signals containing location information from each relay within the second group of relays to each relay within a third group of relays within the array; and
determining a location of each relay within the third group of relays based on the location information received from each relay within the second group of relays;
wherein each relay within the third group of relays determines its own location.

55. The method recited in claim 52, wherein providing location information to each relay within a first group of relays within the array comprises providing Global Positioning System units within each relay within the first group.

56. The method recited in claim 53, further comprising using topographical information in combination with the computed time delay of arrival of the signals from the first group of relays to determine the location of each relay within the second group of relays.

57. A method for propagating relay locations within an array of relays, comprising:
providing location information to each tag within a group of tags;
transmitting signals containing the location information from each tag within the group of tags to each relay within a group of relays within the array; and
determining a location of each relay within the group of relays based on the location information received from each tag within the group of tags;
wherein each relay within the group of relays determines its own location.

58. The method recited in claim 57 wherein determining a location of each relay within the group of relays comprises determining a time of arrival of the signals at each relay within the group of relays and computing a time delay of arrival of the signals.

* * * * *